(12) United States Patent
Kashihara et al.

(10) Patent No.: US 12,531,494 B2
(45) Date of Patent: Jan. 20, 2026

(54) INVERTER DEVICE

(71) Applicant: SANDEN CORPORATION, Isesaki (JP)

(72) Inventors: Tatsuki Kashihara, Isesaki (JP); Yushi Araki, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 350 days.

(21) Appl. No.: 18/040,196

(22) PCT Filed: Aug. 3, 2021

(86) PCT No.: PCT/JP2021/028712
§ 371 (c)(1),
(2) Date: Jul. 10, 2023

(87) PCT Pub. No.: WO2022/039018
PCT Pub. Date: Feb. 24, 2022

(65) Prior Publication Data
US 2023/0412092 A1 Dec. 21, 2023

(30) Foreign Application Priority Data
Aug. 17, 2020 (JP) .................. 2020-137385

(51) Int. Cl.
*H02M 7/5387* (2007.01)
*H02M 1/12* (2006.01)

(52) U.S. Cl.
CPC ....... *H02M 7/53871* (2013.01); *H02M 1/123* (2021.05)

(58) Field of Classification Search
CPC .................................................. H02M 1/123
See application file for complete search history.

(56) References Cited

U.S. PATENT DOCUMENTS

| 7,053,587 B2 * | 5/2006 | Ito ........................ H02P 27/085 318/729 |
| 2011/0025240 A1 * | 2/2011 | Furukawa ........... H02M 7/5395 318/400.3 |

(Continued)

FOREIGN PATENT DOCUMENTS

| CN | 111480287 A | 7/2020 |
| JP | 10-23760 A | 1/1998 |

(Continued)

OTHER PUBLICATIONS

Japan Patent Office, Notice of Reasons for Refusal issued in Japanese Patent Application No. 2020-137385, mailed Jun. 25, 2024 (10 pages).

(Continued)

*Primary Examiner* — Gary A Nash
(74) *Attorney, Agent, or Firm* — Baker Botts L.L.P.

(57) ABSTRACT

An inverter device is provided which is based on a discontinuous modulation method and makes it possible to further reduce common mode noise. A control device 21 includes a phase voltage command operation unit 33 which calculates a continuous modulation voltage command value, an inter-line modulation operation unit 34 which calculates a discontinuous modulation voltage command value which fixes an ON/OFF state of a switching element of one phase of an inverter circuit 28 and modulates an ON/OFF state of switching elements of the other two phases, and a PWM signal generation unit 36 which performs PWM control on the inverter circuit. The control device synchronizes switching timings of the switching elements of the two phases in which the ON/OFF state is modulated, and cancels out a change in a phase voltage applied to a motor 8 by a change in another phase voltage.

8 Claims, 14 Drawing Sheets

(56) References Cited

U.S. PATENT DOCUMENTS

| | | | |
|---|---|---|---|
| 2013/0155740 A1* | 6/2013 | Takubo | H02M 7/53875 |
| | | | 363/98 |
| 2017/0294862 A1* | 10/2017 | Takahashi | H02M 1/44 |
| 2019/0131904 A1* | 5/2019 | Aoki | H02M 7/53871 |
| 2020/0395881 A1 | 12/2020 | Hanioka et al. | |

FOREIGN PATENT DOCUMENTS

| | | |
|---|---|---|
| JP | 2007-295786 A | 11/2007 |
| JP | 2019-115158 A | 7/2019 |
| WO | 2019/180763 A1 | 9/2019 |

OTHER PUBLICATIONS

International Search Report mailed Sep. 28, 2021 for International Application No. PCT/JP2021/028712.
The State Intellectual Property Office of People's Republic of China, The First Office Action issued in Chinese Patent Application No. 202180057211.7, on Oct. 11, 2025 (10 pages).
Japan Patent Office, Notice of Reason for Cancellation issued in Japanese Patent Application No. 2020-137385 (Patent No. 7594382), on Aug. 28, 2025 (13 pages).

* cited by examiner

INVERTER DEVICE

CROSS-REFERENCE TO RELATED APPLICATIONS

This application is a U.S. National Stage Patent Application under 37 U.S.C. § 371 of International Patent Application No. PCT/JP2021/028712, filed on Aug. 3, 2021, which claims the benefit of Japanese Patent Application No. JP 2020-137385, filed on Aug. 17, 2020, the disclosures of each of which are incorporated herein by reference in their entirety.

TECHNICAL FIELD

The present invention relates to an inverter device which applies a three-phase AC output to a motor by an inverter circuit to drive the motor.

BACKGROUND ART

Conventionally, an inverter device for driving a motor includes a three-phase inverter circuit constituted of a plurality of switching elements, and PWM (Pulse Width Modulation)-controls the switching elements of each phase of UVW and applies a voltage waveform close to a sine wave to the motor to drive it. However, common mode noise generated due to the fluctuation of a neutral point potential of the motor has been a problem.

For example, in the case of a motor constituting an electric compressor, this common mode noise is generated by a common mode current which leaks through a stray capacitance between a compressor housing and the ground, but in the past, a noise filter was installed to satisfy regulations. A problem, however, arises in that the installation of such a noise filter results in an increase in the size of the device, and the cost also rises.

On the other hand, there has also been proposed a method of correcting a continuous modulation voltage command value (U-phase voltage command value Vu', V-phase voltage command value Vv', W-phase voltage command value Vw') to adjust the switching timings of upper and lower arm switching elements of each phase, thereby canceling the generation of common mode noise due to the fluctuation of a neutral point potential (refer to, for example, Patent Document 1).

Next, FIG. 10 is a diagram showing a U-phase voltage command correction value Cu' obtained by correcting the U-phase voltage command value Vu', a V-phase voltage command correction value Cv' obtained by correcting the V-phase voltage command value Vv', and a W-phase voltage command correction value Cw' obtained by correcting the W-phase voltage command value Vw', a carrier signal (carrier), each phase voltage of a U-phase voltage Vu, a V-phase voltage Vv, and a W-phase voltage Vw (PWM signal), and a neutral point potential Vc of a motor in an inverter device of such a method. Incidentally, each value in FIG. 10 is a value after normalization (corrected to −1 to 1) with a DC voltage Vdc.

In this case, since the carrier signal (solid line) of the sawtooth wave is used, a rise-up command value Cu' up (fine broken line, the same applies hereinafter) and a fall-down command value Cu' down (wide broken line, the same applies hereinafter) exist in the U-phase voltage command correction value Cu' within one carrier cycle. Likewise, a rise-up command value Cv' up and a fall-down command value Cv' down exist even in the V-phase voltage command correction value Cv' within one carrier cycle, and a rise-up command value Cw' up and a fall-down command value Cw' down exist even in the W-phase voltage command correction value Cw' within one carrier cycle.

Then, the rise-up command value Cu' up and the fall-down command value Cu' down of the U-phase voltage command correction value Cu', the rise-up command value Cv' up and the fall-down command value Cv' down of the V-phase voltage command correction value Cv', and the rise-up command value Cw' up and the fall-down command value Cw' down of the W-phase voltage command correction value Cw', and the carrier signal are compared in magnitude to generate a PWM signal which becomes a drive command signal of an inverter circuit. This PWM signal becomes each phase voltage of the U-phase voltage Vu, the V-phase voltage Vv, and the W-phase voltage Vw after normalization.

Then, the neutral point potential Vc of the motor is calculated by (Vu+Vv+Vw)/3 as the average value of each phase voltage, but in the method of Patent Document 1, the switching timings of the upper and lower arm switching elements of each phase are synchronized by the voltage command correction values Cu', Cv', and Cw' as shown in FIG. 11 to cancel the change in the phase voltage applied to the motor by the change in the other phase voltage, thereby suppressing the fluctuation of the neutral point potential Vc. Incidentally, FIG. 11 is an enlarged view of a frame Z1 part of FIG. 10. Further, the conditions in this case are, for example, a carrier frequency of 20 kHz and a DC voltage of 350V. In addition, in each figure, since it is desired to compare the fluctuation width of the neutral point potential Vc with an integer, it is expressed by Vc=(Vu+Vv+Vw) instead of the average value.

Further, as shown in FIG. 11, a specified section of switching is started from a state in which the upper arm switching element is turned ON in the U phase, and the lower arm switching element is turned ON in the V phase and the W phase. For example, in a phase t9 of 45° and a phase t11 slightly over 52° in FIG. 11, a rise-up command value Cu' up is generated so that the V-phase voltage Vv rises in accordance with the timing when the U-phase voltage Vu falls. In a phase t10 of 46.5° and a phase t12 slightly in front of 54°, a fall-down command value Cw' down is generated so that the W phase voltage Vw falls in accordance with the timing at which the U phase voltage Vu rises. Consequently, the fluctuation of the neutral point potential Vc in each phase of t9 to t12 is canceled. Incidentally, the fluctuation width of the neutral point potential Vc becomes 2 of −1 to 1 (FIGS. 10 and 11).

Thus, it is possible to theoretically reduce the common mode noise generated in one carrier cycle to ⅓. FIG. 12 shows a frequency spectrum (FFT result) of the neutral point potential in the inverter device of the above method, and FIG. 13 shows a frequency spectrum of a neutral point potential in an inverter device of a general continuous modulation method. As is clear from each figure, according to the above method, it can be seen that the fluctuation of the neutral point potential Vc is suppressed as compared with the general continuous modulation.

CITATION LIST

Patent Documents

Patent Document 1: WO2019/180763A1
Patent Document 2: Japanese Patent Application Laid-Open No. 2019-115158

SUMMARY OF THE INVENTION

Problems to be Solved by the Invention

However, a problem arises in that when the rising timing of the V-phase voltage and the falling timing of the W-phase voltage are respectively matched to the falling timing (t9, t11) and the rising timing (t10, t12) of the U-phase voltage as in the above method, a modulation width becomes narrow, and a high modulation rate cannot be achieved, so that the area in which the motor can be driven becomes very narrow.

On the other hand, in recent years, there has also been proposed an inverter device to which a method called discontinuous modulation is applied, for the purpose of reducing the loss and heat generation of a switching element. The inverter device of this discontinuous modulation method fixes an ON/OFF state of any one of the UVW phases, and controls only the other two phases while modulating an ON/OFF state, thereby performing PWM control while reducing the number of switchings of the switching element and reducing the switching loss and the amount of heat generated as compared with the continuous modulation method (refer to, for example, Patent Document 2). Further, since the number of times the neutral point potential fluctuates is also naturally reduced as the number of switchings is reduced, the common mode noise can be surely reduced to $2/3$.

FIG. 14 shows a U-phase voltage command value, a V-phase voltage command value, and a W-phase voltage command value being discontinuous modulation voltage command values generated from continuous modulation voltage command values (U-phase voltage command value Vu', V-phase voltage command value Vv', and W-phase voltage command value Vw') by U, V, and W respectively in an inverter device of a general discontinuous modulation method. In this case as well, each value is a value after normalization (corrected to −1 to 1) with a DC voltage Vdc.

Further, in this case as well, since a carrier signal (solid line) of a sawtooth wave is used, a rise-up command value Uup and a fall-down command value Udown exist in the U-phase voltage command value U of the discontinuous modulation within one carrier cycle. Similarly, a rise-up command value Vup and a fall-down command value Vdown exist even in the V-phase voltage command value V of the discontinuous modulation within one carrier cycle, and a rise-up command value Wup and a fall-down command value Wdown exist even in the W-phase voltage command value W of the discontinuous modulation within one carrier cycle.

Then, the rise-up command value Uup and the fall-down command value Udown of the U-phase voltage command value Cu, the rise-up command value Vup and the fall-down command value Vdown of the V-phase voltage command value V, and the rise-up command value Wup and the fall-down command value Wdown of the W-phase voltage command value W, and the carrier signal are compared in magnitude to generate a PWM signal which becomes a drive command signal of an inverter circuit. This PWM signal becomes each phase voltage of the U-phase voltage Vu, the V-phase voltage Vv, and the W-phase voltage Vw after normalization.

As shown in FIG. 14, in the phase of 0° to 120°, the lower arm switching element of the W phase is fixed to the ON state, and in the phase of 120° to 240°, the lower arm switching element of the U phase is fixed to the ON state. Further, in the phase of 240° to 360°, the lower arm switching element of the V phase is fixed to the ON state.

Then, the neutral point potential Vc of the motor is similarly calculated by (Vu+Vv+Vw)/3 as the average value of each phase voltage, but in the method of Patent Document 2, the number of switchings of the upper and lower arm switching elements of each phase is reduced to $2/3$ at each of the voltage command values U, V, and W of discontinuous modulation as shown in FIG. 15. Therefore, the common mode noise generated by the fluctuation of the neutral point potential Vc is also reduced to $2/3$ as compared with the general continuous modulation method. Incidentally, the fluctuation width of the neutral point potential Vc becomes 4 (−3 to 1). Further, FIG. 15 is an enlarged view of a frame 2 part of FIG. 14. Further, the conditions in this case are also a carrier frequency of 20 kHz and a DC voltage of 350V.

FIG. 16 shows a frequency spectrum of the neutral point potential in the inverter device of such a discontinuous modulation method. As is also clear from this figure, according to the discontinuous modulation method, the fluctuation of the neutral point potential Vc is suppressed as compared with the general continuous modulation (FIG. 13) while maintaining a high modulation rate.

The present invention has been made in view of the above-described conventional situations, and provides an inverter device which is based on a discontinuous modulation method and is capable of further reducing common mode noise.

Means for Solving the Problems

An inverter device of the present invention includes an inverter circuit having an upper arm switching element and a lower arm switching element connected in series for each phase between an upper arm power supply line and a lower arm power supply line, and applying a phase voltage at a connection point of the upper and lower arm switching elements of each phase to a motor as a three-phase AC output, and a control device which controls switching of the upper and lower arm switching elements of each phase of the inverter circuit. The inverter device is characterized in that the control device includes a phase voltage command operation unit which calculates and outputs a continuous modulation voltage command value for generating a voltage applied to each phase of the motor, an inter-line modulation operation unit which calculates based on the continuous modulation voltage command value, a discontinuous modulation voltage command value which fixes an ON/OFF state of the upper and lower arm switching elements of one phase of the inverter circuit, and modulates an ON/OFF state of the upper and lower arm switching elements of the other two phases, and a PWM signal generation unit which generates a PWM signal, PWM-controlling the inverter circuit, based on the discontinuous modulation voltage command value, and in that the control device synchronizes switching timings of the upper and lower arm switching elements of the two phases in which the ON/OFF state is modulated, and cancels a change in the phase voltage applied to the motor by a change in the other phase voltage.

The inverter device of the invention of claim 2 is characterized in that in the above invention, the control device starts a specified section of switching from a state in which the upper arm switching element of one of the two phases in which the ON/OFF state is modulated is turned ON, and the lower arm switching element of the other is turned ON.

The inverter device of the invention of claim 3 is characterized in that in the above respective inventions, the control device synchronizes only either one of timings of a fall in the phase voltage of one of the two phases in which the ON/OFF state is modulated and a rise in the phase voltage of the other, and timings of a rise in the phase voltage of the one and a fall in the phase voltage of the other.

The inverter device of the invention of claim 4 is characterized in that in the above invention, the control device selects and synchronizes the timing with which a surge voltage at the time of switching is larger.

The inverter device of the invention of claim 5 is characterized in that in the above respective inventions, the control device always modulates the ON/OFF state in the upper and lower arm switching elements of a specific one phase and fixes the ON/OFF state of the upper and lower arm switching elements of one of the remaining two phases.

The inverter device of the invention of claim 6 is characterized in that in the above invention, the upper and lower arm switching elements of the specific one phase are arranged in a heat exchange relationship with a place where the temperature becomes the lowest in an electric compressor.

The inverter device of the invention of claim 7 is characterized in that in the above respective inventions, the inter-line modulation operation unit outputs the discontinuous modulation voltage command value which always modulates the ON/OFF state of the upper and lower arm switching elements of the specific one phase and fixes the ON/OFF state of the upper and lower arm switching elements of one of the remaining two phases, and the PWM signal generation unit corrects the discontinuous modulation voltage command value output by the inter-line modulation operation unit to cancel the change in the phase voltage applied to the motor by the change in the other phase voltage.

Advantageous Effect of the Invention

According to the present invention, there is provided an inverter device including an inverter circuit having an upper arm switching element and a lower arm switching element connected in series for each phase between an upper arm power supply line and a lower arm power supply line, and applying a phase voltage at a connection point of the upper and lower arm switching elements of each phase to a motor as a three-phase AC output, and a control device which controls switching of the upper and lower arm switching elements of each phase of the inverter circuit. In the inverter device, the control device includes a phase voltage command operation unit which calculates and outputs a continuous modulation voltage command value for generating a voltage applied to each phase of the motor, an inter-line modulation operation unit which calculates based on the continuous modulation voltage command value, a discontinuous modulation voltage command value which fixes an ON/OFF state of the upper and lower arm switching elements of one phase of the inverter circuit, and modulates an ON/OFF state of the upper and lower arm switching elements of the other two phases, and a PWM signal generation unit which generates a PWM signal PWM-controlling the inverter circuit, based on the discontinuous modulation voltage command value. Therefore, it is possible to reduce the number of switchings of the upper and lower arm switching elements by discontinuous modulation, reduce a switching loss and the amount of generated heat, and also reduce the fluctuation of a neutral point potential of the motor.

In the present invention, in addition to that, the control device synchronizes the switching timings of the upper and lower arm switching elements of the two phases in which the ON/OFF state is modulated, and cancels a change in the phase voltage applied to the motor by a change in the other phase voltage. Therefore, it is possible to further suppress the fluctuation of the neutral point potential of the motor by the switching timing of the switching element and remarkably suppress the generation of common mode noise.

Further, even if an error occurs in the synchronization of the switching timing, a noise suppression effect by reducing the fluctuation of the neutral point potential by the above discontinuous modulation can be obtained at the minimum. Therefore, as a whole, it is possible to stably realize a inverter device with little noise.

In this case, as in the invention of claim 2, if the control device starts a specified section of switching from a state in which the upper arm switching element of one of the two phases in which the ON/OFF state is modulated is turned ON, and the lower arm switching element of the other thereof is turned ON, the change in the phase voltage can be smoothly canceled by the change in the other phase voltage.

In particular, as in the invention of claim 3, if the control device synchronizes only either one of timings of a fall in the phase voltage of one of the two phases in which the ON/OFF state is modulated and a rise in the phase voltage of the other thereof, and timings of a rise in the phase voltage of the one thereof and a fall in the phase voltage of the other thereof, it is possible to eliminate or suppress the inconvenience of narrowing a modulation width and drive the motor at a high modulation rate.

In this case, as in the invention of claim 4, if the control device selects and synchronizes the timing with which a surge voltage at the time of switching is larger, it is possible to effectively suppress a surge voltage generated in a circuit.

Further, as in the invention of claim 5, if the control device always modulates the ON/OFF state of the upper and lower arm switching elements of a specific one phase and fixes the ON/OFF state of the upper and lower arm switching elements of one of the remaining two phases, it is possible to easily and smoothly realize both discontinuous modulation and synchronization of switching timing.

In this case, as in the invention of claim 6, the upper and lower arm switching elements of the specific one phase are arranged in a heat exchange relationship with a place where the temperature becomes the lowest in an electric compressor. Therefore, the upper and lower arm switching elements are always switched without the ON/OFF state being fixed, and the upper and lower arm switching elements of the specific one phase in which the temperature rises are effectively cooled. It is thus possible to avoid inconvenience such as the forced stop of the electric compressor in advance.

Further, as in the invention of claim 7, if the inter-line modulation operation unit outputs the discontinuous modulation voltage command value which always modulates the ON/OFF state of the upper and lower arm switching elements of the specific one phase and fixes the ON/OFF state of the upper and lower arm switching elements of one of the remaining two phases, and the PWM signal generation unit corrects the discontinuous modulation voltage command value output by the inter-line modulation operation unit to cancel the change in the phase voltage applied to the motor by the change in the other phase voltage, the inter-line modulation operation unit no longer outputs such a discontinuous modulation voltage command value as to cancel the change in the phase voltage by the change in the other phase voltage, and the calculation is simplified.

MODE FOR CARRYING OUT THE INVENTION

Hereinafter, embodiments of the present invention will be described in detail with reference to the drawings. First, an electric compressor (so-called inverter-integrated electric compressor) 16 of an embodiment integrally equipped with an inverter device 1 of the present invention will be described with reference to FIGS. 2 and 3. Incidentally, the electric compressor 16 of the embodiment constitutes a part of a refrigerant circuit of an air conditioner for a vehicle mounted on a vehicle such as an engine-driven vehicle, a hybrid vehicle, or an electric vehicle.

(1) Configuration of Electric Compressor 16

Figure 2:
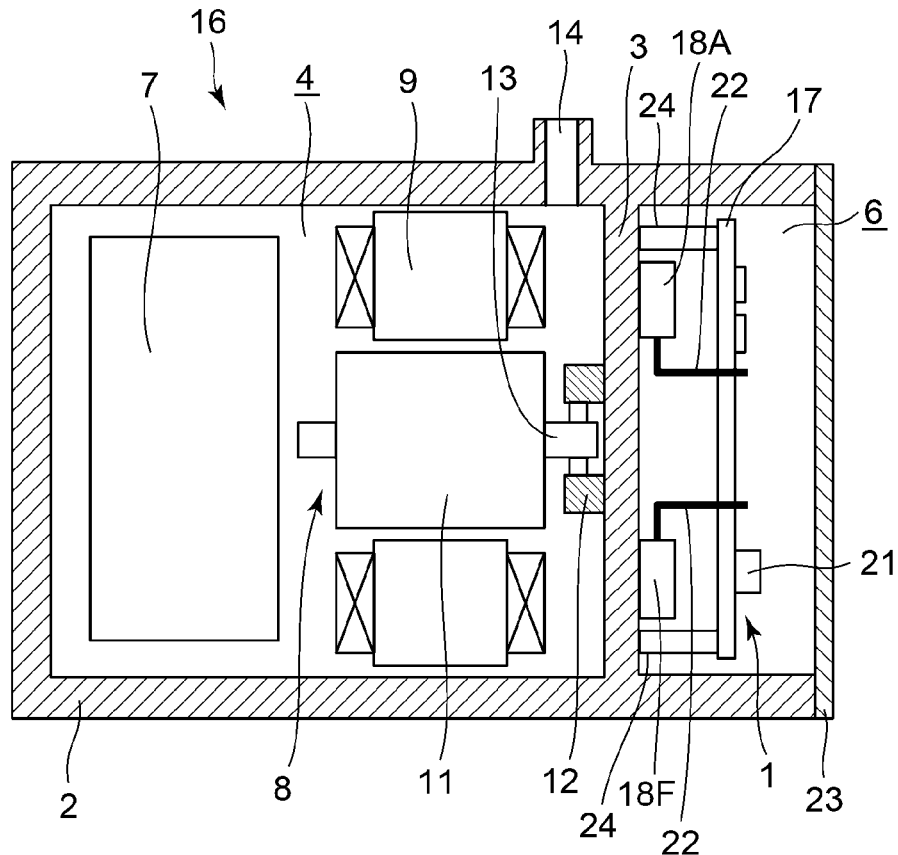
FIG. 2 is a vertical sectional side view of an electric compressor of one embodiment equipped with the inverter device of FIG. 1.

In FIG. 2, the inside of a metallic tubular housing 2 of the electric compressor 16 is partitioned into a compression mechanism accommodating section 4 and an inverter accommodating section 6 by a partition wall 3 intersecting the axial direction of the housing 2. For example, a scroll type compression mechanism 7 and a motor 8 for driving the compression mechanism 7 are accommodated in the compression mechanism accommodating section 4. In this case, the motor 8 is an IPMSM (Interior Permanent Magnet Synchronous Motor) comprised of a stator 9 fixed to the housing 2 and a rotor 11 which rotates inside the stator 9.

A bearing part 12 is formed in the central portion of the partition wall 3 on the compression mechanism accommodating section 4 side. One end of a drive shaft 13 of the rotor 11 is supported by the bearing part 12, and the other end of the drive shaft 13 is connected to the compression mechanism 7. A suction port 14 is formed in the vicinity of the partition wall 3 at a position corresponding to the compression mechanism accommodating section 4 of the housing 2. When the rotor 11 (drive shaft 13) of the motor 8 rotates to drive the compression mechanism 7, a low-temperature refrigerant which is a working fluid flows into the compression mechanism accommodating section 4 of the housing 2 from the suction port 14, and is sucked into the compression mechanism 7 to be compressed.

Then, the refrigerant compressed by the compression mechanism 7 and brought to a high temperature and high pressure is arranged to be discharged to the refrigerant circuit outside the housing 2 from an unillustrated discharge port. Further, the low-temperature refrigerant flowing in from the suction port 14 passes around the motor 8 through the vicinity of the partition wall 3 and is sucked into the compression mechanism 7, so that the partition wall 3 is also cooled.

Then, the inverter device 1 of the present invention which drives and controls the motor 8 is accommodated in the inverter accommodating section 6 partitioned from the compression mechanism accommodating section 4 by the partition wall 3. In this case, the inverter device 1 is configured to supply power to the motor 8 via a sealed terminal or a lead wire which penetrates the partition wall 3.

(2) Structure of Inverter Device 1 (Arrangement of Switching Elements 18A to 18F)

In the case of the embodiment, the inverter device 1 is constituted of a substrate 17, a total of six switching elements of upper arm switching elements 18A, 18B, and 18C and lower arm switching elements 18D, 18E, and 18F wired on one surface side of the substrate 17, a control device 21 wired on the other surface side of the substrate 17, and an HV connector, an LV connector, and the like which are not shown, etc. In the embodiment, each of the upper and lower arm switching elements 18A to 18F is comprised of an insulated gate bipolar transistor (IGBT) or the like in which a MOS structure is incorporated in a gate portion.

In this case, in the embodiment, the upper arm switching element 18A and the lower arm switching element 18D of a U-phase half bridge circuit 19U of a three-phase inverter circuit 28 to be described later, the upper arm switching element 18B and the lower arm switching element 18E of a V-phase half bridge circuit 19V thereof, and the upper arm switching element 18C and the lower arm switching element 18F of a W-phase half bridge circuit 19W thereof are arranged two by two respectively. This set of arranged upper and lower arm switching elements 18A and 18D, upper and lower arm switching elements 18B and 18E, and upper and lower arm switching elements 18C and 18F are arranged radially around the center of the substrate 17 shown in FIG. 3.

Figure 3:
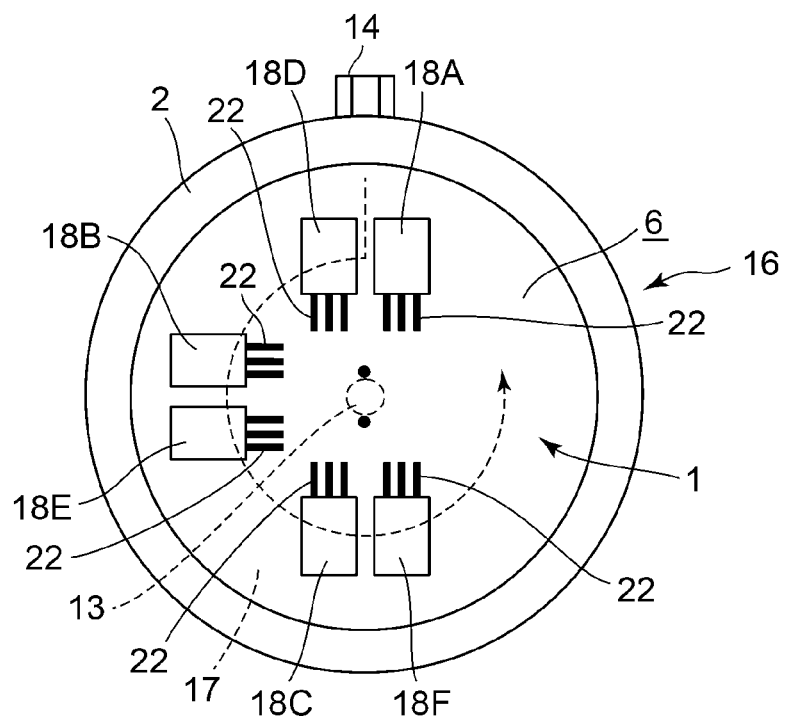
FIG. 3 is a side view of the electric compressor of FIG. 2 excluding a cover and a substrate as seen from an inverter accommodating section side.

Further, in the embodiment, the upper and lower arm switching elements 18A and 18D of the U-phase half bridge circuit 19U are located on the suction port 14 side, whereas the upper and lower arm switching elements 18B and 18E of the V-phase half bridge circuit 19V are arranged at a position of 90° counterclockwise in FIG. 3. The upper and lower arm switching elements 18C and 18F of the W phase half bridge circuit 19W are arranged at a position opposite to the suction port 14. Then, the refrigerant sucked from the suction port 14 rotates counterclockwise about the axis of the housing 2 as shown by a broken line arrow in FIG. 3. Therefore, the upper and lower arm switching elements 18A and 18D of the U-phase half bridge circuit 19U are located on the most upstream side (the place where the temperature becomes the lowest in the electric compressor 16) with respect to the flow of the sucked refrigerant, the upper and lower arm switching elements 18B and 18E of the V-phase half bridge circuit 19V are located on the downstream side thereof, and the switching elements 18C and 18F of the W-phase half bridge circuit 19W are arranged on the most downstream side.

Further, terminal portions 22 of the switching elements 18A to 18F are connected to the substrate 17 in a state of being on the center side of the substrate 17. Then, the inverter device 1 assembled in this way is accommodated in the inverter accommodating section 6 in a state in which one surface side where the switching elements 18A to 18F exist assumes the partition wall 3 side, and is attached to the partition wall 3 and then blocked by a cover 23. In this case, the substrate 17 is fixed to the partition wall 3 via boss portions 24 which stand up from the partition wall 3.

In the state in which the inverter device 1 is attached to the partition wall 3 in this way, the switching elements ISA to 18F are brought into close contact with the partition wall 3 directly or via a predetermined insulating thermal conductive material, and have a heat exchange relationship with the partition wall 3 of the housing 2. At this time, the switching elements 18A to 18F are arranged at positions avoiding the places corresponding to the bearing part 12 and the drive shaft 13 and are arranged so as to surround their peripheries (FIG. 3).

Then, since the partition wall 3 is cooled by the refrigerant sucked into the compression mechanism accommodating section 4 as described above, the switching elements 18A to 18F have a heat exchange relationship with the sucked refrigerant through the partition wall 3, and are cooled by the refrigerant sucked into the compression mechanism accommodating portion 4 through the thickness of the partition wall 3. The switching elements 18A to 18F themselves radiate heat to the refrigerant through the partition wall 3.

(3) Circuit Configuration of Inverter Device 1

Figure 1:
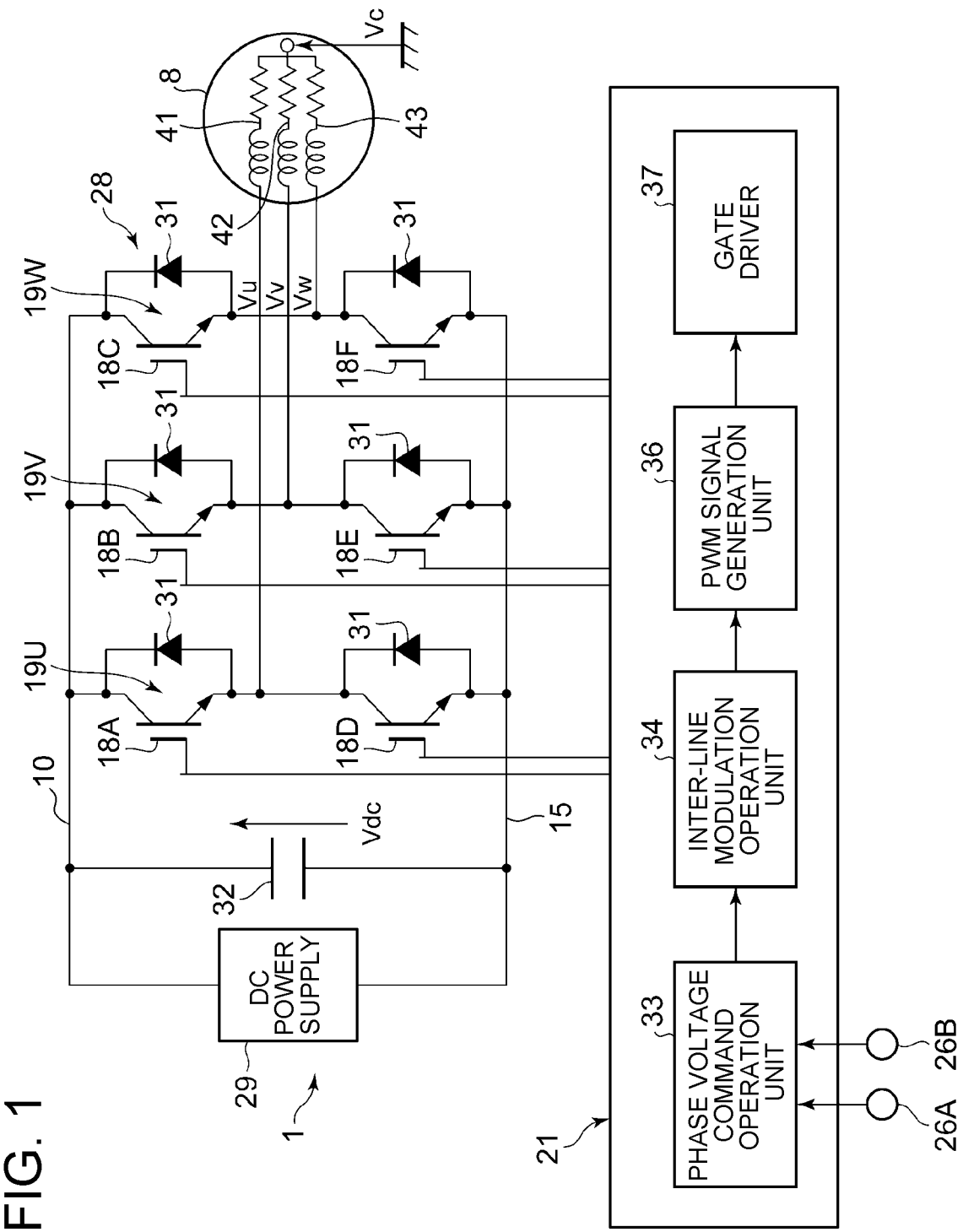
FIG. 1 is an electric circuit diagram of an inverter device according to one embodiment of the present invention.

Next, in FIG. 1, the inverter device 1 includes the above-mentioned three-phase inverter circuit 28 and control device 21. The inverter circuit 28 is a circuit which converts a DC voltage of a DC power supply (vehicle battery: for example, 350V) 29 into a three-phase AC voltage (three-phase AC output) and applies it to the motor 8. The inverter circuit 28 has a U-phase half bridge circuit 190, a V-phase half bridge circuit 19V, and a W-phase half bridge circuit 19W. The phase half bridge circuits 19U to 19W respectively have the upper arm switching elements 18A to 18C and the lower arm switching elements 18D to 18F individually. Further, flywheel diodes 31 are respectively connected in antiparallel to the switching elements 18A to 18F.

Then, the upper end side of the upper arm switching elements 18A to 18C of the inverter circuit 28 is connected to an upper arm power supply line (positive electrode side bus line) 10 of the DC power supply 29 and a smoothing capacitor 32. On the other hand, the lower end side of the lower arm switching elements 18D to 18F of the inverter circuit 28 is connected to a lower arm power supply line (negative electrode side bus line) 15 of the DC power supply 29 and the smoothing capacitor 32.

In this case, the upper arm switching element 18A and the lower arm switching element 18D of the U-phase half bridge circuit 19U are connected in series. The upper arm switching element 18B and the lower arm switching element 18E of the V-phase half bridge circuit 19V are connected in series. The upper arm switching element 18C and the lower arm switching element 18F of the W-phase half bridge circuit 19W are connected in series.

Then, a connection point (U-phase voltage Vu) between the upper arm switching element 18A and the lower arm switching element 18D of the U-phase half bridge circuit 19U is connected to a U-phase armature coil 41 of the motor 8. A connection point (V-phase voltage Vv) between the upper arm switching element 18B and the lower arm switching element 18E of the V-phase half bridge circuit 19V is connected to a V-phase armature coil 42 of the motor 8. A connection point (W-phase voltage Vw) between the upper arm switching element 18C and the lower arm switching element 18F of the W-phase half bridge circuit 19W is connected to a W-phase armature coil 43 of the motor 8.

(4) Configuration of Control Device 21

Next, the control device 21 is constituted of a microcomputer having a processor. In the embodiment, the control device 21 inputs a rotational number command value from a vehicle ECU, and inputs a motor current (phase current) from the motor 8 to thereby control an ON/OFF state (switching) of each of the switching elements 18A to 18F of the inverter circuit 28, based on these. Specifically, the control device 21 controls a gate voltage applied to each of gate terminals of the switching elements 18A to 18F.

The control device 21 of the embodiment has a phase voltage command operation unit 33, an inter-line modulation operation unit 34, a PWM signal generation unit 36, a gate driver 37, and current sensors 26A and 26B each constituted of a current transformer for measuring each of a U-phase current iu, a V-phase current iv, and a W-phase current iw, which are motor currents (phase currents) of each phase flowing through the motor 8. Each of the current sensors 26A and 26B is connected to the phase voltage command operation unit 33.

Incidentally, the current sensor 26A measures the U-phase current iu, and the current sensor 26B measures the V-phase current iv. Then, the W-phase current iw is obtained by calculation from these. Further, as to a method of detecting the motor current of each phase, there are a method of detecting a current value of the lower arm power supply line 15 and estimating the motor current of each phase from the current value and the operating state of the motor 8 by the phase voltage command operation unit 33, etc. in addition to measuring with the current sensors 26A and 26B as in the embodiment. Therefore, the method of detecting and estimating each phase current is not particularly limited.

The phase voltage command operation unit 33 calculates and generates by vector control based on a d-axis current and a q-axis current obtained from the electrical angle, the current command value and the phase current of the motor 8, continuous modulation voltage command values Vu' (hereinafter, U-phase voltage command value Vu') Vv' (hereinafter, V-phase voltage command value Vv'), and Vw' (hereinafter, W-phase voltage command value Vw') for generating the U-phase voltage Vu, V-phase voltage Vv, and W-phase voltage Vw applied to the armature coils 41 to 43 of each phase of the motor 8. The continuous modulation voltage command values Vu', Vv', and Vw' are voltage command values when performing continuous modulation control of the motor 8.

The inter-line modulation operation unit 34 calculates discontinuous modulation voltage command values U (U-phase voltage command value), V (V-phase voltage command value), and W (W-phase voltage command value), based on the continuous modulation voltage command values Vu', Vv', and Vw' arithmetically operated and calculated by the phase voltage command operation unit 33. The operation of the inter-line modulation operation unit 34 will be described later.

The PWM signal generation unit 36 inputs the discontinuous modulation voltage command values U, V, and W arithmetically operated and calculated by the inter-line modulation operation unit 34, corrects these discontinuous modulation voltage command values U, V, and W as will be described later, and then compares in magnitude between these and a carrier signal to thereby generate and output a PWM signal to be a drive command signal of each of the U-phase half bridge circuit 19U, the V-phase half bridge circuit 19V, and the W-phase half bridge circuit 19W of the inverter circuit 28.

The gate driver 37 generates based on the PWM signal output from the PWM signal generation unit 36, each of the gate voltage of the switching elements 18A and 18D of the U-phase half bridge circuit 19U, the gate voltage of the switching elements 18B and 18E of the V-phase half bridge circuit 19V, and the gate voltage of the switching elements 18C and 18F of the W-phase half bridge circuit 19W.

Then, each of the switching elements 18A to 18F of the inverter circuit 28 is ON/OFF driven based on the gate voltage output from the gate driver 37. That is, when the gate voltage becomes an ON state (predetermined voltage value), the switching element is ON operated. When the gate voltage becomes an OFF state (zero), the switching element is OFF operated. When the switching elements 18A to 18F are the above-mentioned IGBTs, the gate driver 37 is a circuit for applying the gate voltage to the IGBT based on the PWM signal, and is constituted of a photocoupler, a logic IC, a transistor, and the like.

Then, the voltage at the connection point between the upper arm switching element 18A and the lower arm switching element 18D of the U-phase half bridge circuit 19U is applied (output) to the U-phase armature coil 41 of the motor 8 as the U-phase voltage Vu (phase voltage). The voltage at the connection point between the upper arm switching element 18B and the lower arm switching element 18E of the V-phase half bridge circuit 19V is applied (output) to the V-phase armature coil 42 of the motor 8 as the V-phase voltage Vv (phase voltage). The voltage at the connection point between the upper arm switching element 18C and the lower arm switching element 18F of the W-phase half bridge circuit 19W is applied (output) to the W-phase armature coil 43 of the motor 8 as the W-phase voltage Vw (phase voltage).

(5) Operation of Control Device 21

Next, the operation of the control device 21 will be described with reference to FIGS. 4 to 9.

(5-1) Operation of Inter-Line Modulation Operation Unit 34

The inter-line modulation operation unit 34 of the control device 21 of the embodiment always modulates an ON/OFF state in the U-phase upper and lower arm switching elements 18A and 18D for the specific one phase in the embodiment, compares the V-phase voltage command value Vv' and the W-phase voltage command value Vw' being the continuous modulation voltage command values calculated by the phase voltage command operation unit 33 for the remaining two phases, that is, the V phase and the W phase, and calculates and outputs the U-phase voltage command value U, the V-phase voltage command value V, and the W-phase voltage command value W being the discontinuous modulation voltage command values which fix the ON/OFF states of the switching elements 18B, 18E, 18C, and 18F of the phase having the maximum absolute value to the ON or OFF state to thereby perform discontinuous modulation control of reducing the number of switchings of the switching elements 18A to 18E as compared with the case of performing the continuous modulation control.

In such discontinuous modulation control, since the number of switchings of the switching elements 18A to 18F of each phase is reduced to $2/3$, a switching loss generated in each of the switching elements 18A to 18F and heat generated thereby are suppressed as compared with the continuous modulation control. Further, with the reduction in the number of switchings, the fluctuation of the neutral point potential Vc is also surely suppressed to $2/3$ by the discontinuous modulation control.

(5-2) Operation of PWM Signal Generation Unit 36

Figure 4:
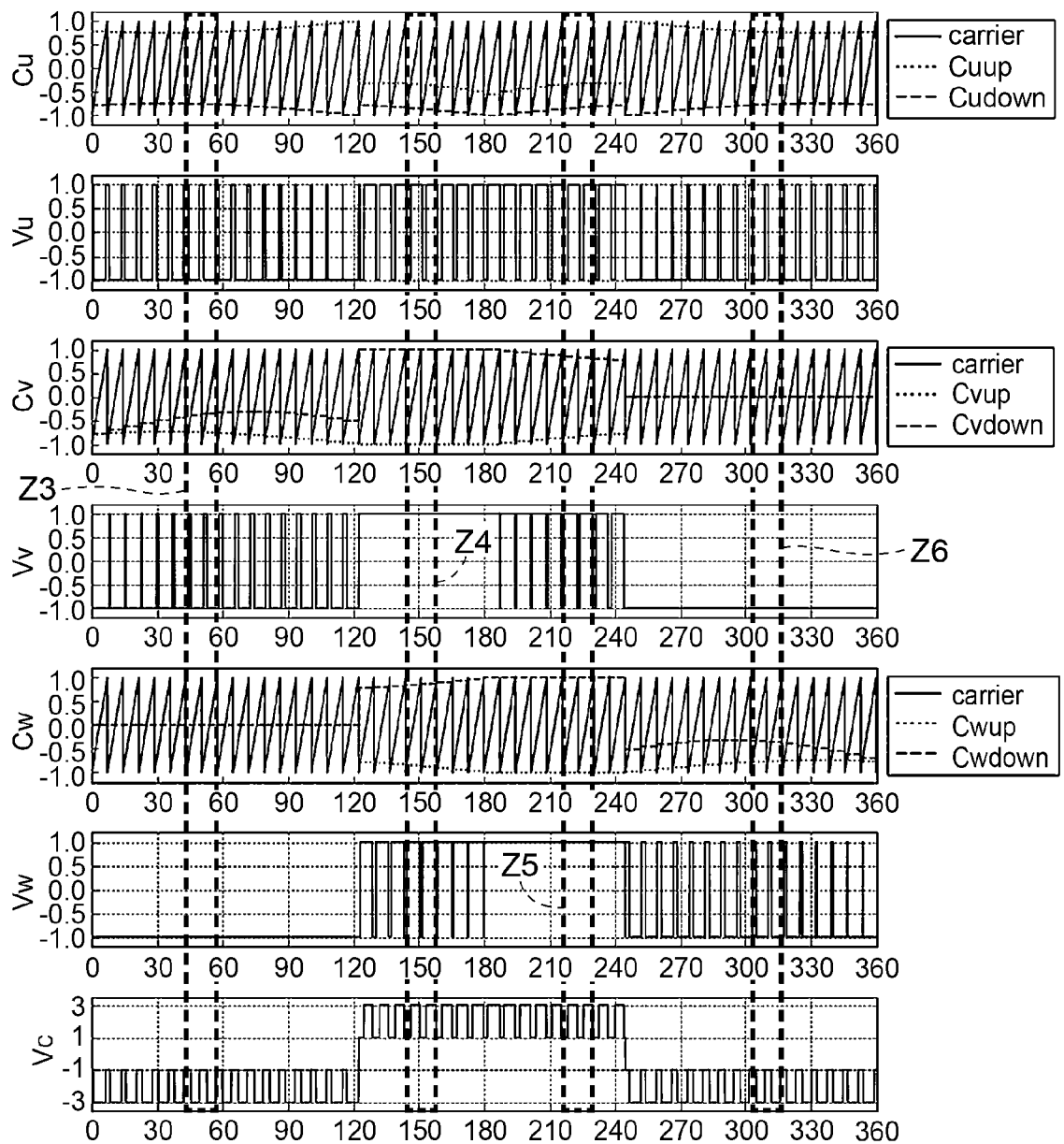
FIG. 4 is a diagram showing discontinuous modulation voltage command correction values, a carrier signal, phase voltages, and a neutral point potential of a motor in the inverter device of FIG. 1.
Figure 5:
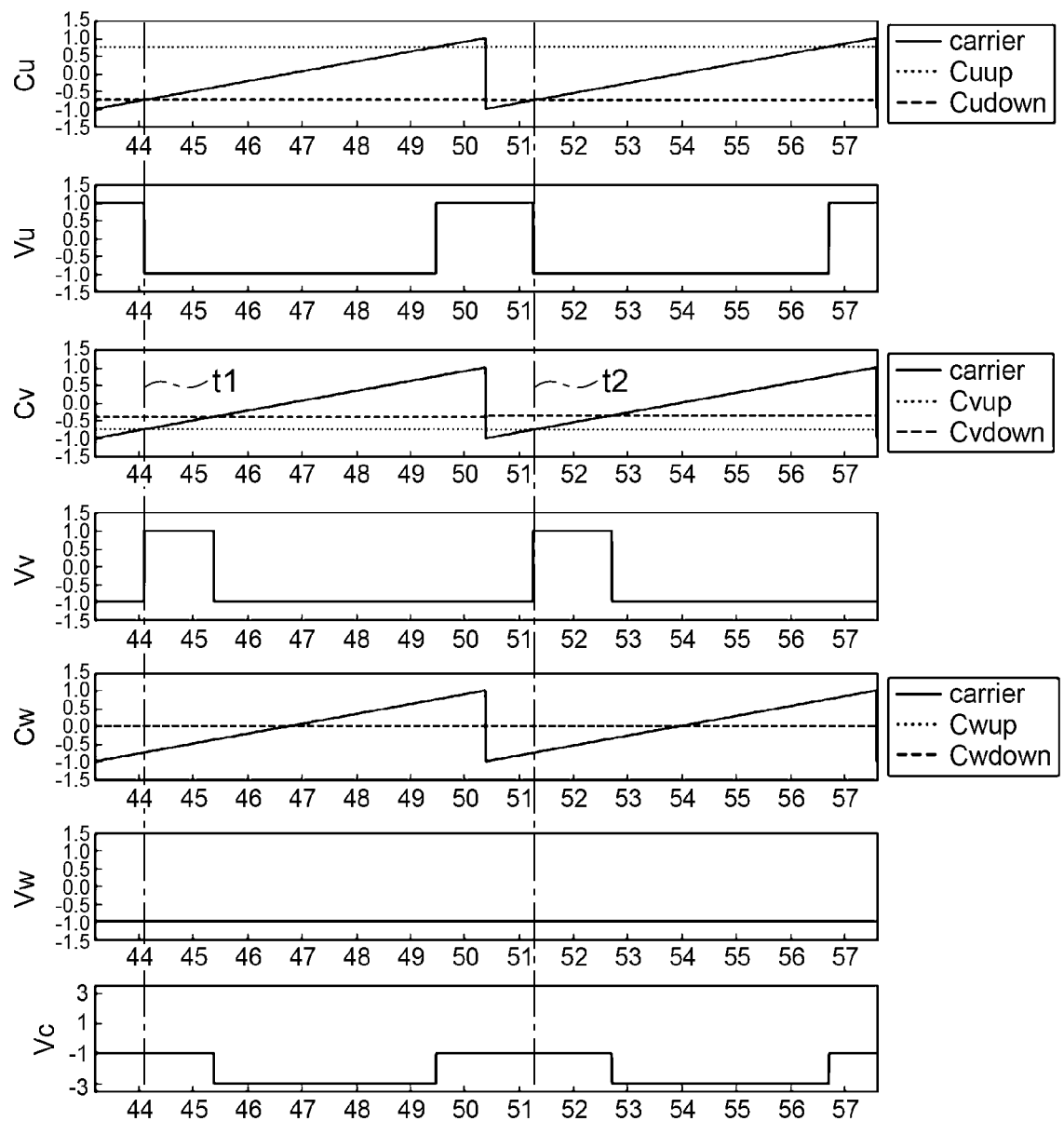
FIG. 5 is an enlarged view of a frame Z3 part of FIG. 4.
Figure 6:
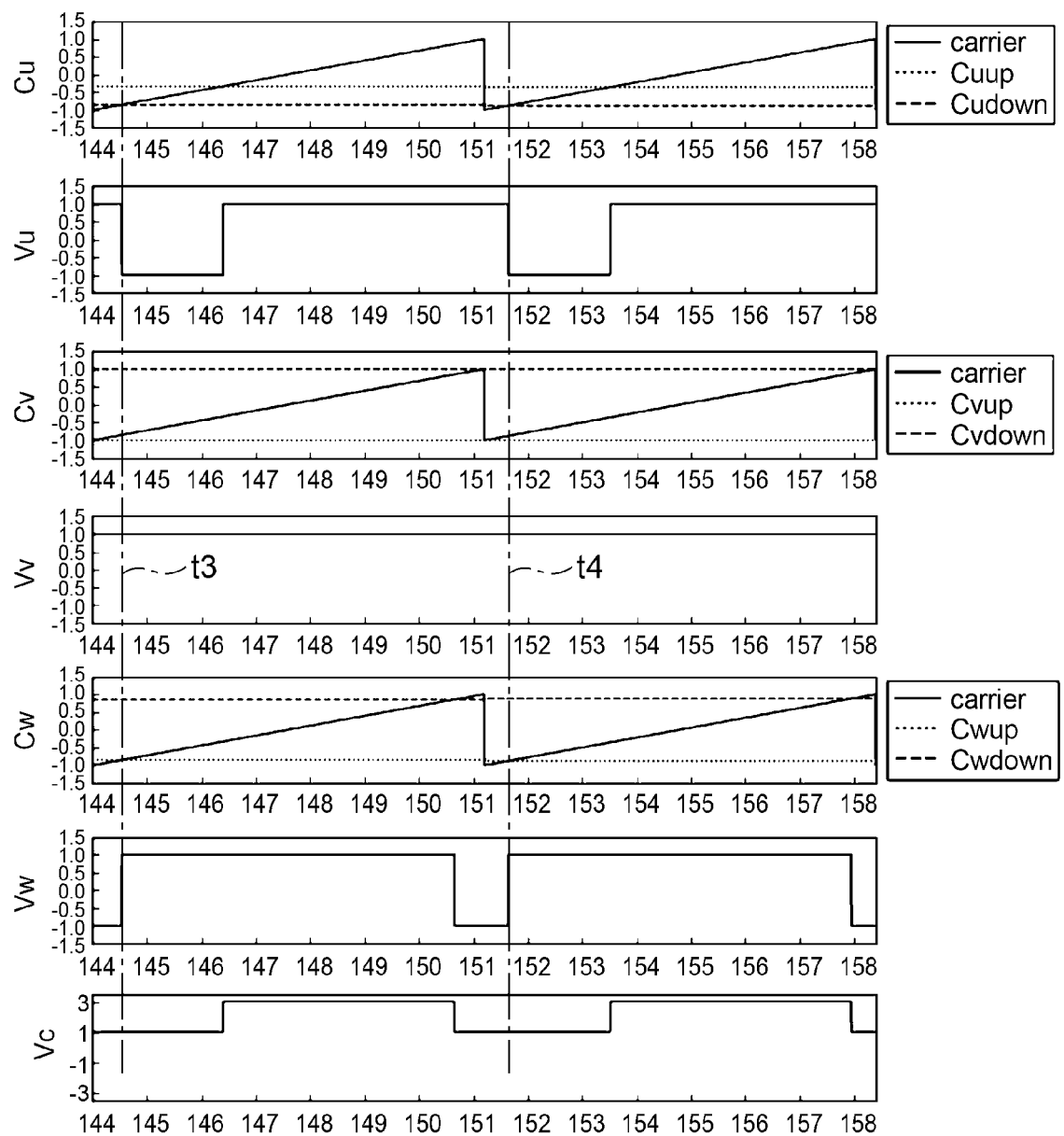
FIG. 6 is an enlarged view of a frame Z4 part of FIG. 4.
Figure 7:
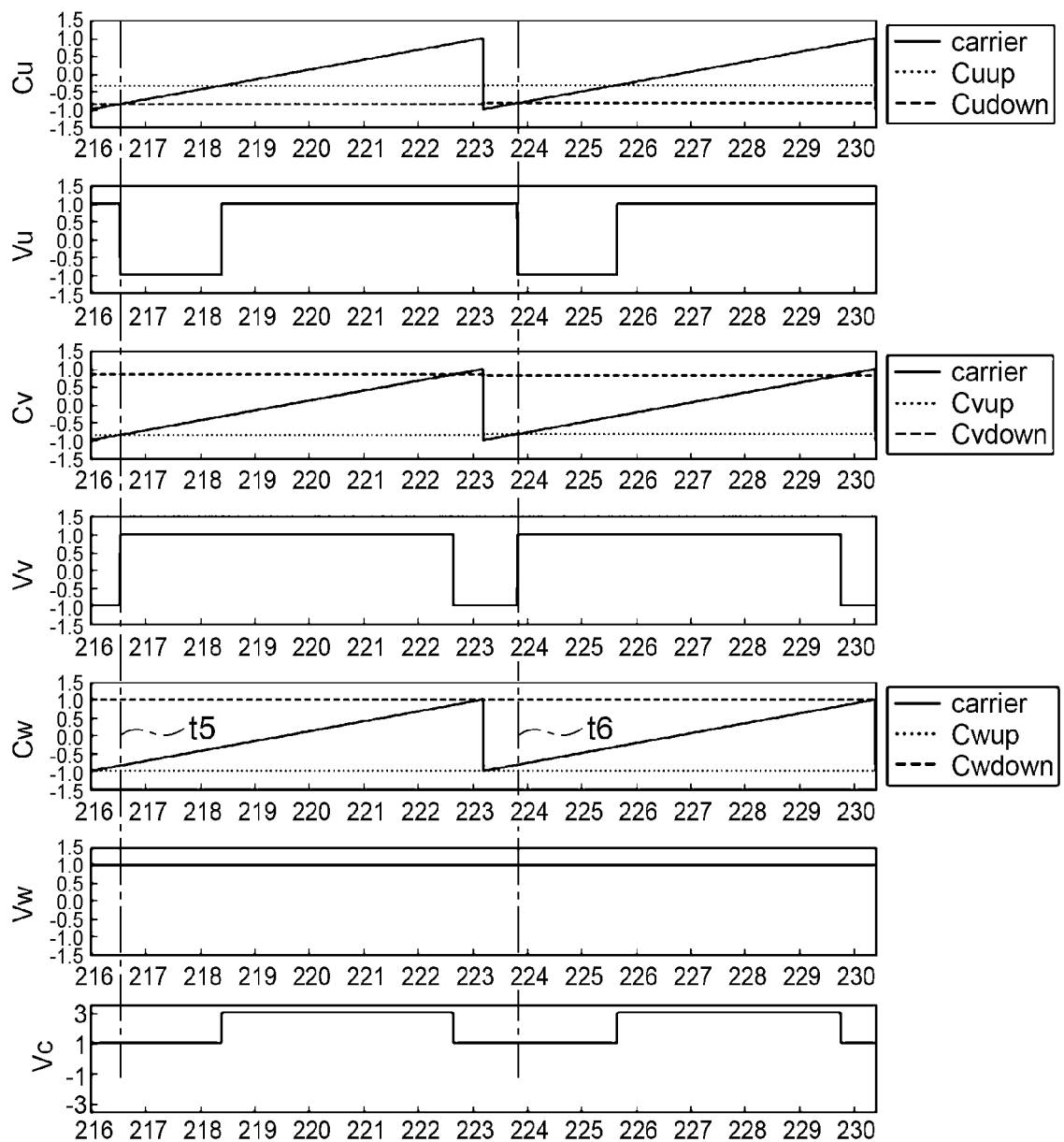
FIG. 7 is an enlarged view of a frame Z5 part of FIG. 4.
Figure 8:
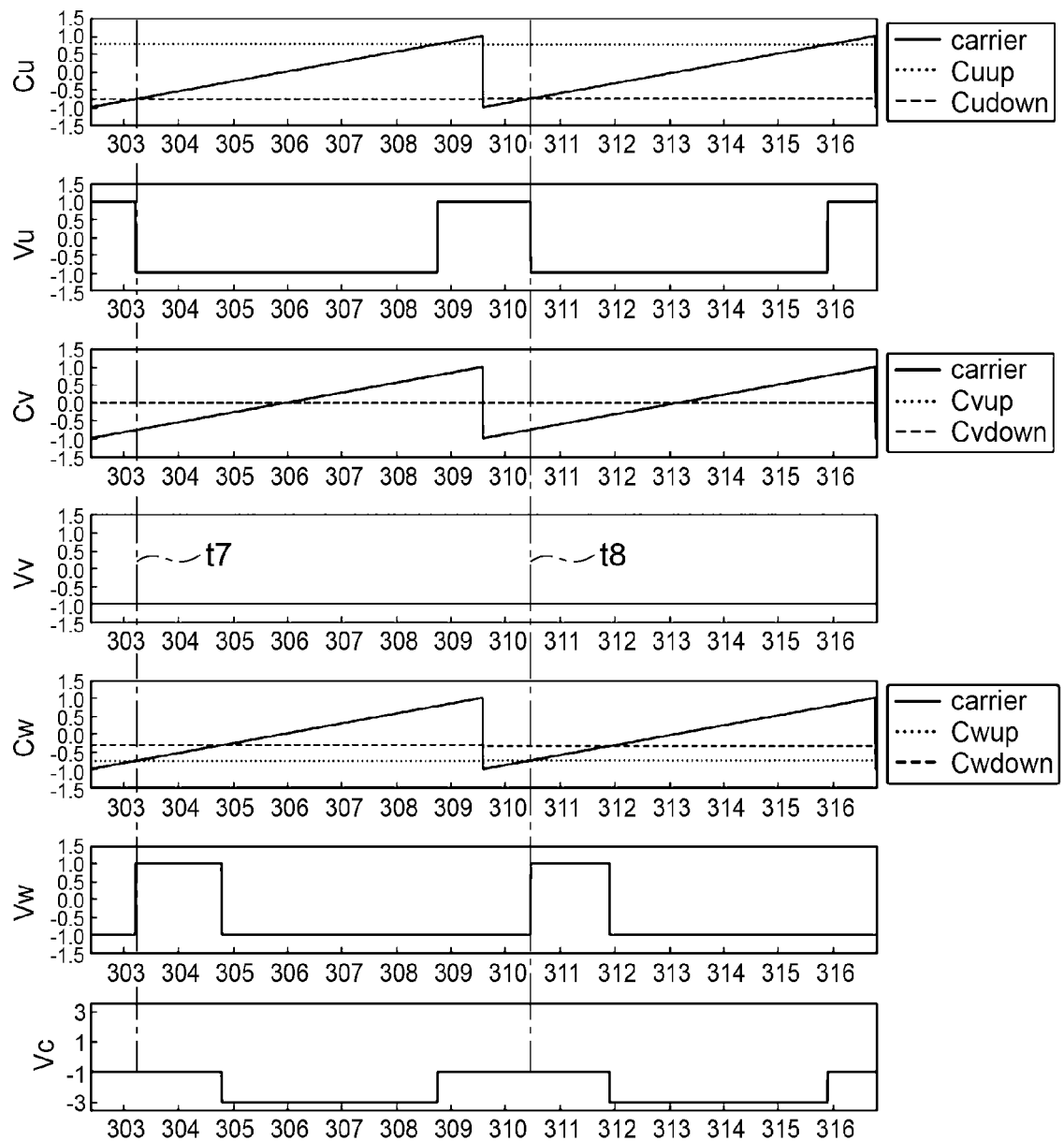
FIG. 8 is an enlarged view of a frame Z6 part of FIG. 4.

Next, the operation of the PWM signal generation unit 36 of the control device 21 of the embodiment will be described. FIG. 4 is a diagram showing a U-phase voltage command correction value Cu, a V-phase voltage command correction value Cv, and a W-phase voltage command correction value Cw of discontinuous modulation in which the U-phase voltage command value U, the V-phase voltage command value V, and the W-phase voltage command value W being the discontinuous modulation voltage command values of the inverter device 1 are corrected, a carrier signal (carrier), phase voltages Vu, Vv, and Vw, and a neutral point potential Vc of the motor 8. FIG. 5 is an enlarged view of the frame Z3 part of FIG. 4, FIG. 6 is an enlarged view of the frame Z4 part of FIG. 4, FIG. 7 is an enlarged view of the frame Z5 part of FIG. 4, and FIG. 8 is an enlarged view of the frame Z6 part of FIG. 4.

Incidentally, each value in each figure is a value after normalization (corrected to −1 to 1) with a DC voltage Vdc. Further, even in the conditions in this case, the carrier frequency is 20 kHz, and the DC voltage is 350V. In FIG. 4, the lower arm switching element 18F of the W phase is fixed to the ON state in the phase of 0° to 120°, the upper arm switching element 18B of the V phase is fixed to the ON state in the phase of 120° to 180°, the upper arm switching element 18C of the W phase is fixed to the ON state in the phase of 180° to 240°, and the lower arm switching element 18E of the V phase is fixed to the ON state in the phase of 240° to 360°.

The PWM signal generation unit 36 of the embodiment adds a correction to the U-phase voltage command value U, V-phase voltage command value V, and W-phase voltage command value W which are the discontinuous modulation voltage command values output by the inter-line modulation operation unit 34 to take them as the U-phase voltage command correction value Cu, V-phase voltage command correction value Cv, and W-phase voltage command correction value Cw for the discontinuous modulation, makes the switching timings of the upper and lower arm switching elements 18A to 18F of each phase synchronized, and cancels changes in the phase voltages Vu, Vv, and Vw applied to the motor 8 by changes in the other phase voltages to thereby execute the control of suppressing the fluctuation of the neutral point potential Vc.

Hereinafter, the operation of the PWM signal generation unit 36 will be specifically described with reference to each figure. In this case as well, since the carrier signal (solid line) of the sawtooth wave is used, a rise-up command value Cuup (fine broken line. the same applies hereinafter) and a fall-down command value Cudown (wide broken line, the same applies hereinafter) exist in the U-phase voltage command correction value Cu within one carrier cycle. Likewise, a rise-up command value Cvup and a fall-down command value Cvdown exist even in the V-phase voltage command correction value Cv within one carrier cycle, and a rise-up command value Cwup and a fall-down command value Cwdown exist even in the W-phase voltage command correction value Cw within one carrier cycle.

Then, the rise-up command value Cuup and the fall-down command value Cudown of the U-phase voltage command correction value Cu, the rise-up command value Cvup and the fall-down command value Cvdown of the V-phase voltage command correction value Cv, and the rise-up command value Cwup and the fall-down command value Cwdown of the W-phase voltage command correction value Cw, and the carrier signal are compared in magnitude to generate a PWM signal to be a drive command signal of the inverter circuit 28. This PWM signal becomes each phase voltage of the U-phase voltage Vu, the V-phase voltage Vv, and the W-phase voltage Vw after normalization.

In the phase of the frame Z3 part of FIG. 4, as shown in an enlarged form in FIG. 5, the inter-line modulation operation unit 34 starts a specified section of switching from the state in which the upper arm switching element 18A of the U phase in which the ON/OFF state is always modulated is turned ON, and the lower arm switching elements 18E and 18F are turned ON in the remaining V phase and W phase. Further, the upper arm switching element 18C of the W phase is fixed to the OFF state, and the lower arm switching element 18F is fixed to the ON state.

In this state, the PWM signal generation unit 36 generates a V-phase voltage command correction value Cv so as to synchronize the timing at which the U-phase voltage Vu falls and the timing at which the V-phase voltage Vv rises in the example of FIG. 5 (refer to a phase t1 near 44° and a phase t2 near 51° in FIG. 5). Consequently, the fluctuation of the neutral point potential Vc in each of the phases t1 and t2 is canceled. Incidentally, the fluctuation width of the neutral point potential Vc becomes 2 of −3 to −1 (FIGS. 4 and 5).

However, the timing at which the U-phase voltage Vu rises and the timing at which the V-phase voltage Vv falls are not synchronized (refer to a phase near 49.5° and a phase near 57° in FIG. 5). Incidentally, the timing at which the U-phase voltage Vu falls and the timing at which the V-phase voltage Vv rises are not synchronized, but the timing at which the U-phase voltage Vu rises and the timing at which the V-phase voltage Vv falls may be synchronized.

That is, the PWM signal generation unit 36 synchronizes only either one of the timing at which the U-phase voltage Vu falls and the timing at which the V-phase voltage Vv rises, and the timing at which the U-phase voltage Vu rises and the timing at which the V-phase voltage Vv falls. In this case, as to whether the timing at which the U-phase voltage Vu falls and the timing at which the V-phase voltage Vv rises are synchronized, or the timing at which the U-phase voltage Vu rises and the timing at which the V-phase voltage Vv falls are synchronized, the PWM signal generation unit 36 selects and synchronizes the timing with which a surge voltage at the time of switching is larger. This surge voltage is calculated from the motor current (U-phase current iu, V-phase current iv, W-phase current iw) grasped from the detected values of the current sensors 26A and 26B and the parasitic inductance of the electric circuit.

Next, in the phase of the frame Z4 part of FIG. 4, as shown in an enlarged form in FIG. 6, the inter-line modulation operation unit 34 starts a specified section of switching from the state in which the upper arm switching element 18A of the U phase in which the ON/OFF state is always modulated is turned ON, the upper arm switching element 18B of the V phase is turned ON, and the lower arm switching element 18F is turned ON in the W phase. Further, the upper arm switching element 18B of the V phase is fixed to the ON state, and the lower arm switching element 18E is fixed to the OFF state.

In this state, the PWM signal generation unit 36 generates a W-phase voltage command correction value Cw so as to synchronize the timing at which the U-phase voltage Vu falls and the timing at which the W-phase voltage Vw rises in the example of FIG. 6 (refer to a phase t3 near 144.5° and a phase t4 near 152° in FIG. 6). Consequently, the fluctuation of the neutral point potential Vc in each of the phases t3 and t4 is canceled. Incidentally, the fluctuation width of the neutral point potential Vc becomes 2 of 1 to 3 (FIGS. 4 and 6).

However, in this case as well, the timing at which the U-phase voltage Vu rises and the timing at which the W-phase voltage Vw falls are not synchronized (refer to a phase near 146.5° and a phase near 153.5° in FIG. 6). Incidentally, the timing at which the U-phase voltage Vu falls and the timing at which the W-phase voltage Vw rises are not synchronized, but the timing at which the U-phase voltage Vu rises and the timing at which the W-phase voltage Vw falls may be synchronized.

That is, in this case as well, the PWM signal generation unit 36 synchronizes only either one of the timing at which the U-phase voltage Vu falls and the timing at which the W-phase voltage Vw rises, and the timing at which the U-phase voltage Vu rises and the timing at which the W-phase voltage Vw falls. In this case as well, as to whether the timing at which the U-phase voltage Vu falls and the timing at which the W-phase voltage Vw rises are synchronized, or the timing at which the U-phase voltage Vu rises and the timing at which the W-phase voltage Vw falls are synchronized, the PWM signal generation unit 36 selects and synchronizes the timing with which a surge voltage at the time of switching is larger.

Next, in the phase of the frame Z5 part of FIG. 4, as shown in an enlarged form in FIG. 7, the inter-line modulation operation unit 34 starts a specified section of switching from the state in which the upper arm switching element 18A of the U phase in which the ON/OFF state is always modulated is turned ON, the lower arm switching element 18E of the V phase is turned ON, and the upper arm switching element 18C is turned ON in the W phase. Further, the upper arm switching element 18C of the W phase is fixed to the ON state, and the lower arm switching element 18F is fixed to the OFF state.

In this state, the PWM signal generation unit 36 generates a V-phase voltage command correction value Cv so as to synchronize the timing at which the U-phase voltage Vu falls and the timing at which the V-phase voltage Vv rises in the example of FIG. 7 (refer to a phase t5 near 216.5° and a phase t6 near 224° in FIG. 7). Consequently, the fluctuation of the neutral point potential Vc in each of the phases t5 and t6 is canceled. Incidentally, the fluctuation width of the neutral point potential Vc becomes 2 of 1 to 3 (FIGS. 4 and 7).

However, in this case as well, the timing at which the U-phase voltage Vu rises and the timing at which the V-phase voltage Vv falls are not synchronized (refer to a phase near 218° and a phase near 226° in FIG. 6). Incidentally, the timing at which the U-phase voltage Vu falls and the timing at which the V-phase voltage Vv rises are not synchronized, but the timing at which the U-phase voltage Vu rises and the timing at which the V-phase voltage Vv falls may be synchronized.

That is, in this case as well, the PWM signal generation unit 36 synchronizes only either one of the timing at which the U-phase voltage Vu falls and the timing at which the V-phase voltage Vv rises, and the timing at which the U-phase voltage Vu rises and the timing at which the V-phase voltage Vv falls. In this case as well, as to whether the timing at which the U-phase voltage Vu falls and the timing at which the V-phase voltage Vv rises are synchronized, or the timing at which the U-phase voltage Vu rises and the timing at which the V-phase voltage Vv falls are synchronized, the PWM signal generation unit 36 selects and synchronizes the timing with which a surge voltage at the time of switching is larger.

Next, in the phase of the frame Z6 part of FIG. 4, as shown in an enlarged form in FIG. 8, the inter-line modulation operation unit 34 starts a specified section of switching from the state in which the upper arm switching element 18A of the U phase in which the ON/OFF state is always modulated is turned ON, and the lower arm switching elements 18E and 18F of the remaining V and W phases are turned ON. Further, the upper arm switching element 18B of the V phase is fixed to the OFF state, and the lower arm switching element 18E is fixed to the ON state.

In this state, the PWM signal generation unit 36 generates a W-phase voltage command correction value Cw so as to synchronize the timing at which the U-phase voltage Vu falls and the timing at which the W-phase voltage Vw rises in the example of FIG. 8 (refer to a phase t7 near 303° and a phase t8 near 310.5° in FIG. 8). Consequently, the fluctuation of the neutral point potential Vc in each of the phases t7 and t8 is canceled. Incidentally, the fluctuation width of the neutral point potential Vc becomes 2 of −3 to −1 (FIGS. 4 and 8).

However, in this case as well, the timing at which the U-phase voltage Vu rises and the timing at which the W-phase voltage Vw falls are not synchronized (refer to a phase slightly in front of 309° and a phase slightly in front of 316° in FIG. 8). Incidentally, the timing at which the U-phase voltage Vu falls and the timing at which the W-phase voltage Vw rises are not synchronized, but the timing at which the U-phase voltage Vu rises and the timing at which the W-phase voltage Vw falls may be synchronized.

That is, in this case as well, the PWM signal generation unit 36 synchronizes only either one of the timing at which the U-phase voltage Vu falls and the timing at which the W-phase voltage Vw rises, and the timing at which the U-phase voltage Vu rises and the timing at which the W-phase voltage Vw falls. In this case as well, as to whether the timing at which the U-phase voltage Vu falls and the timing at which the W-phase voltage Vw rises are synchronized, or the timing at which the U-phase voltage Vu rises and the timing at which the W-phase voltage Vw falls are synchronized, the PWM signal generation unit 36 selects and synchronizes the timing with which a surge voltage at the time of switching is larger.

Figure 9:
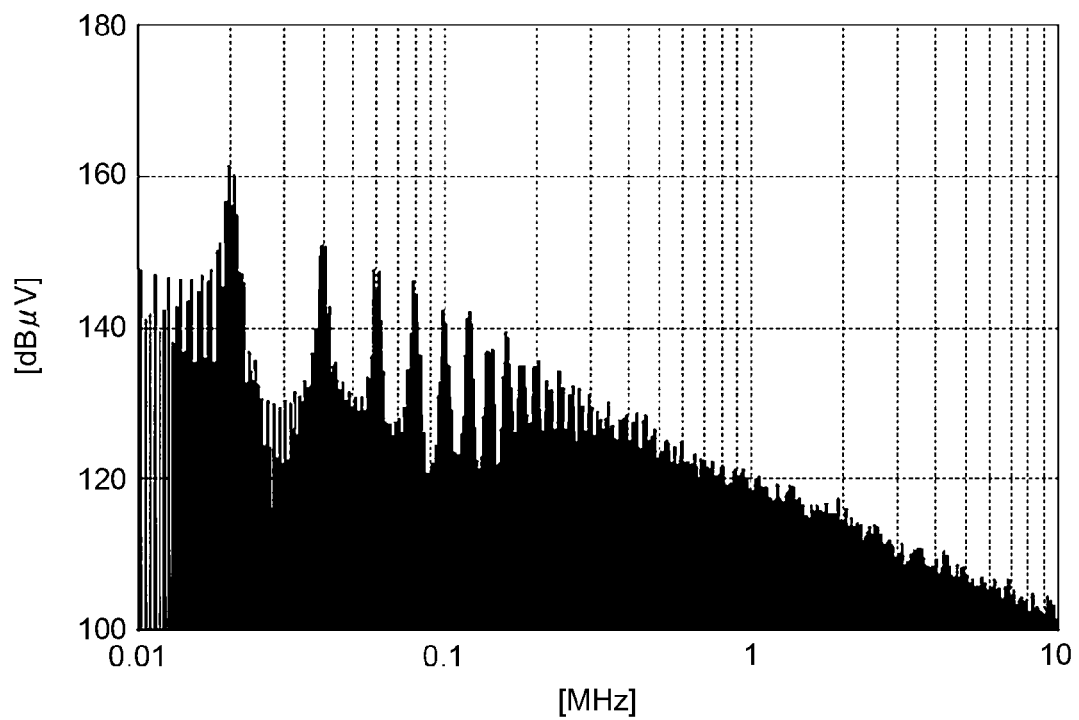
FIG. 9 is a diagram showing a frequency spectrum of the neutral point potential in the inverter device of FIG. 1.
Figure 10:
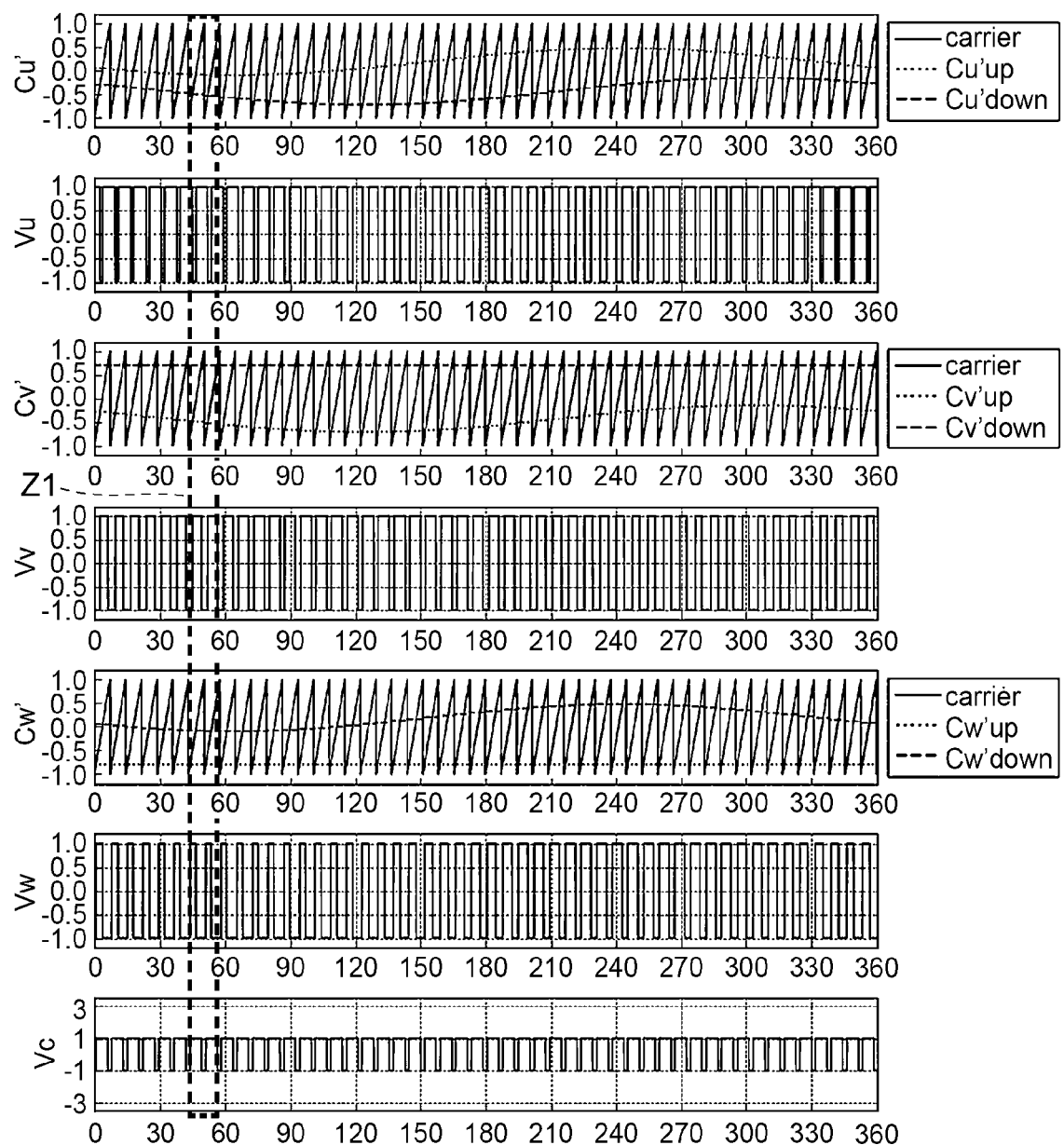
FIG. 10 is a diagram showing three-modulation voltage command correction values, a carrier signal, phase voltages, and a motor neutral point potential in an inverter device which adjusts switching timings by a conventional continuous modulation method.
Figure 11:
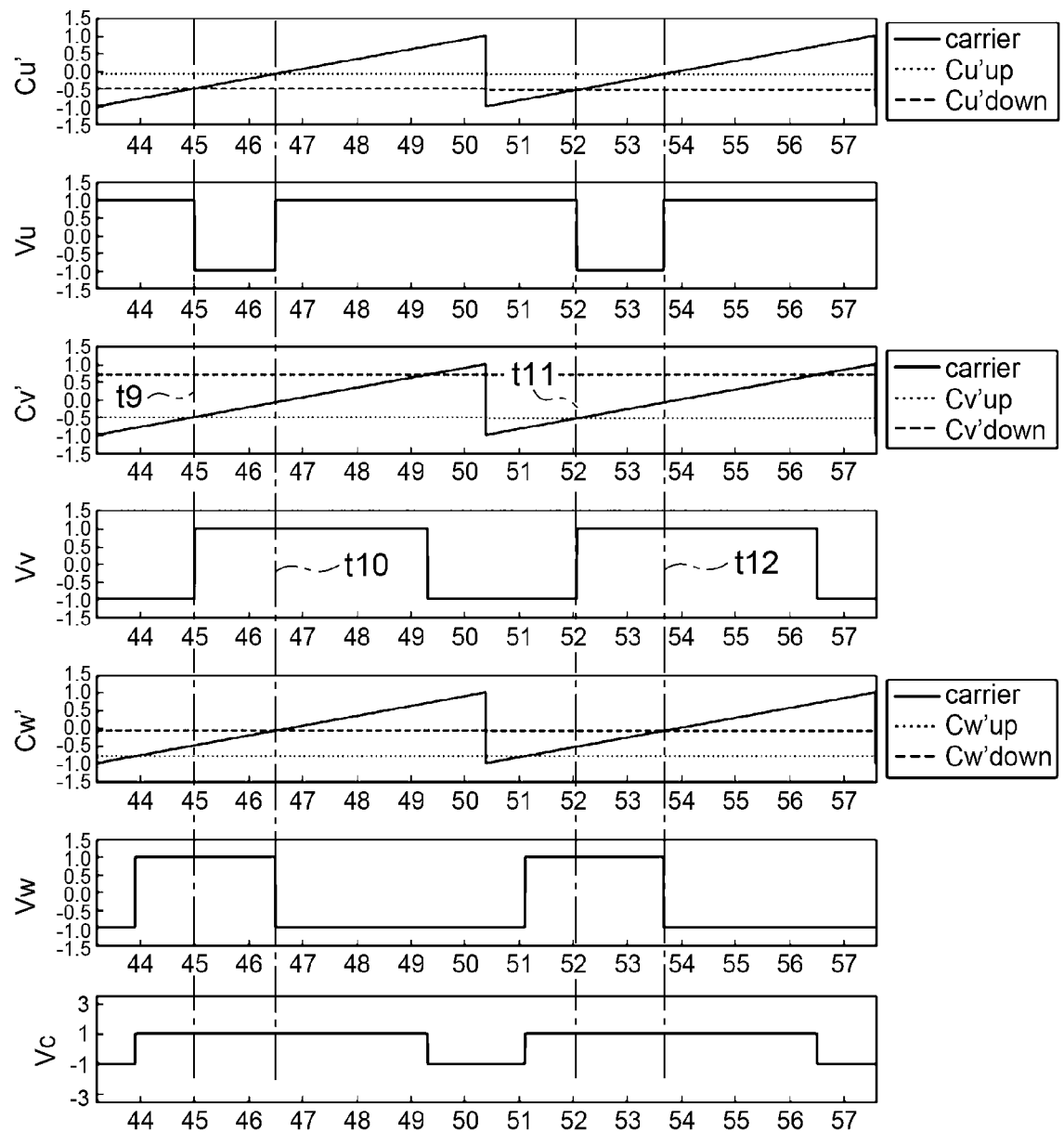
FIG. 11 is an enlarged view of a frame Z1 part of FIG. 10.
Figure 12:
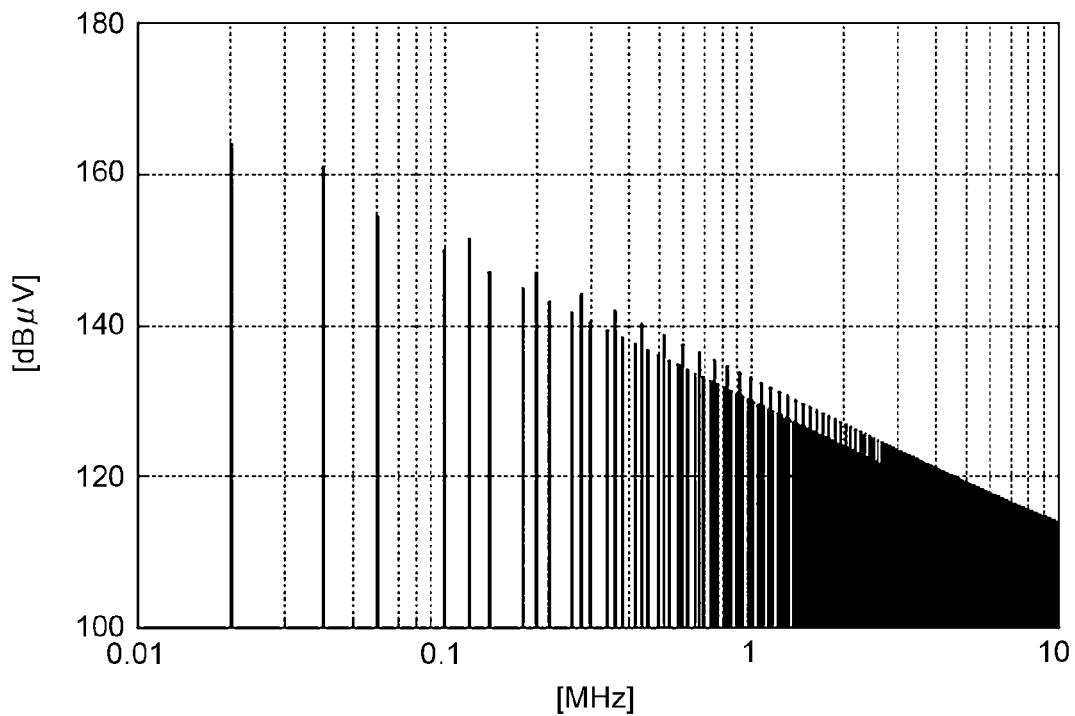
FIG. 12 is a diagram showing a frequency spectrum of the neutral point potential in the inverter device of FIG. 10.
Figure 13:
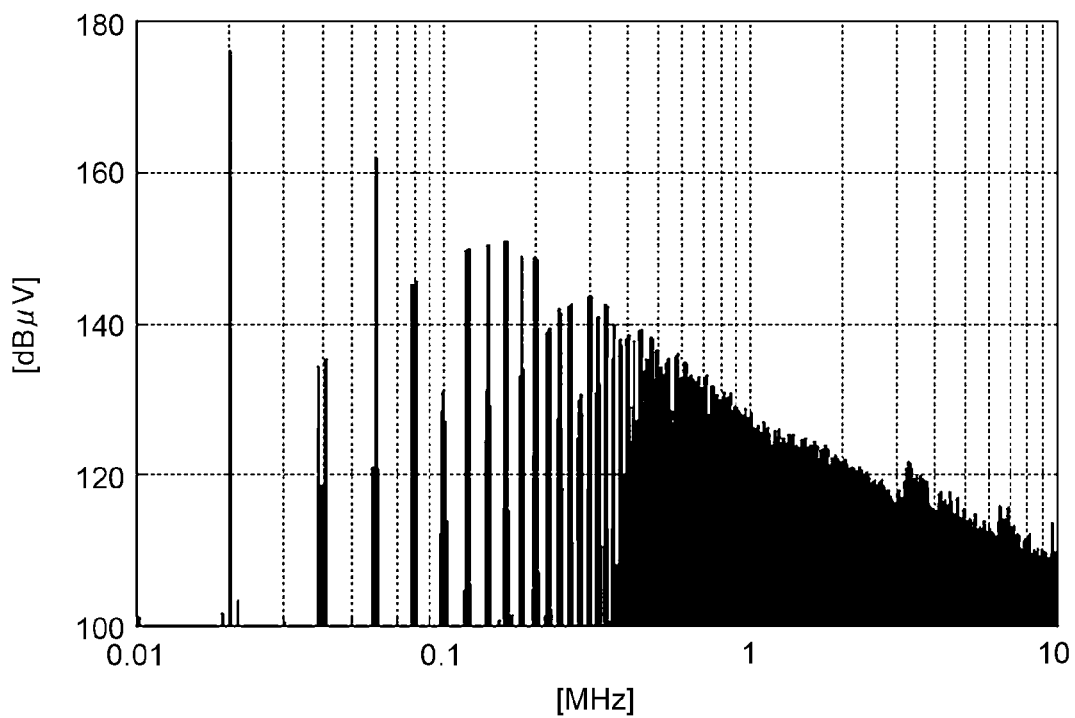
FIG. 13 is a diagram showing a frequency spectrum of a neutral point potential in an inverter device of a general continuous modulation method.
Figure 14:
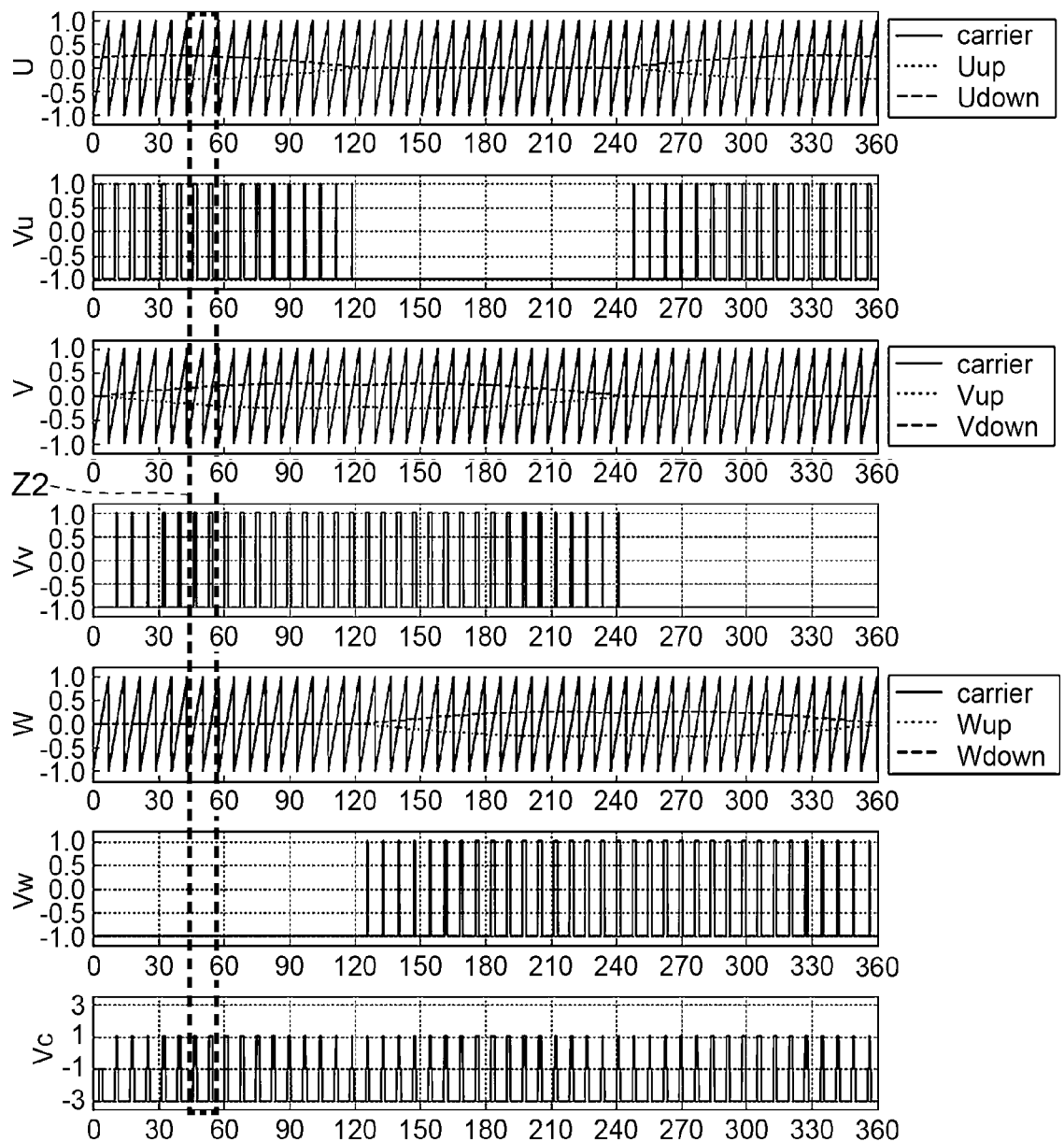
FIG. 14 is a diagram showing voltage command values, a carrier signal, phase voltages, and a motor neutral point potential in a conventional general discontinuous modulation method.
Figure 15:
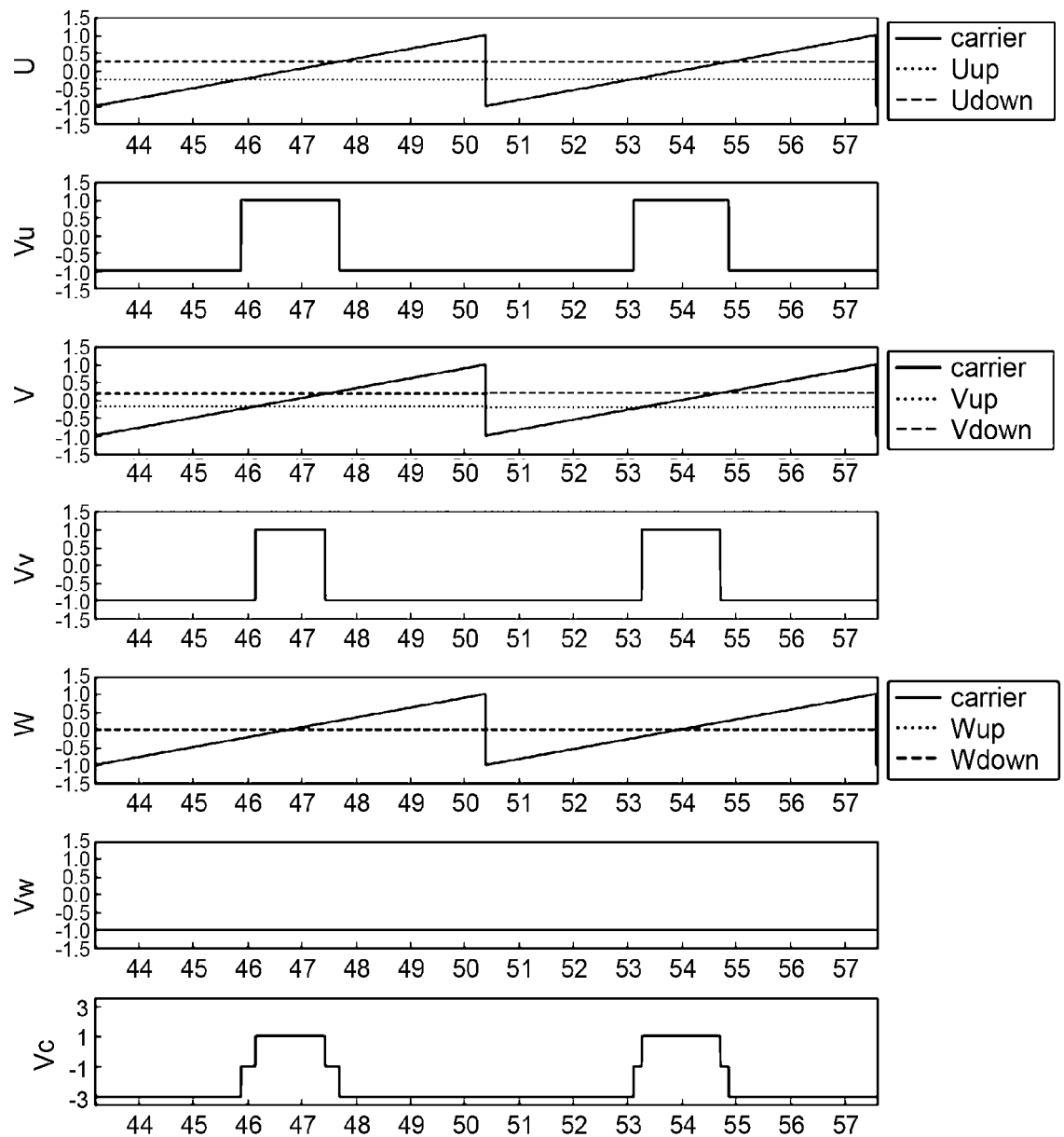
FIG. 15 is an enlarged view of a frame Z2 part of FIG. 14.
Figure 16:
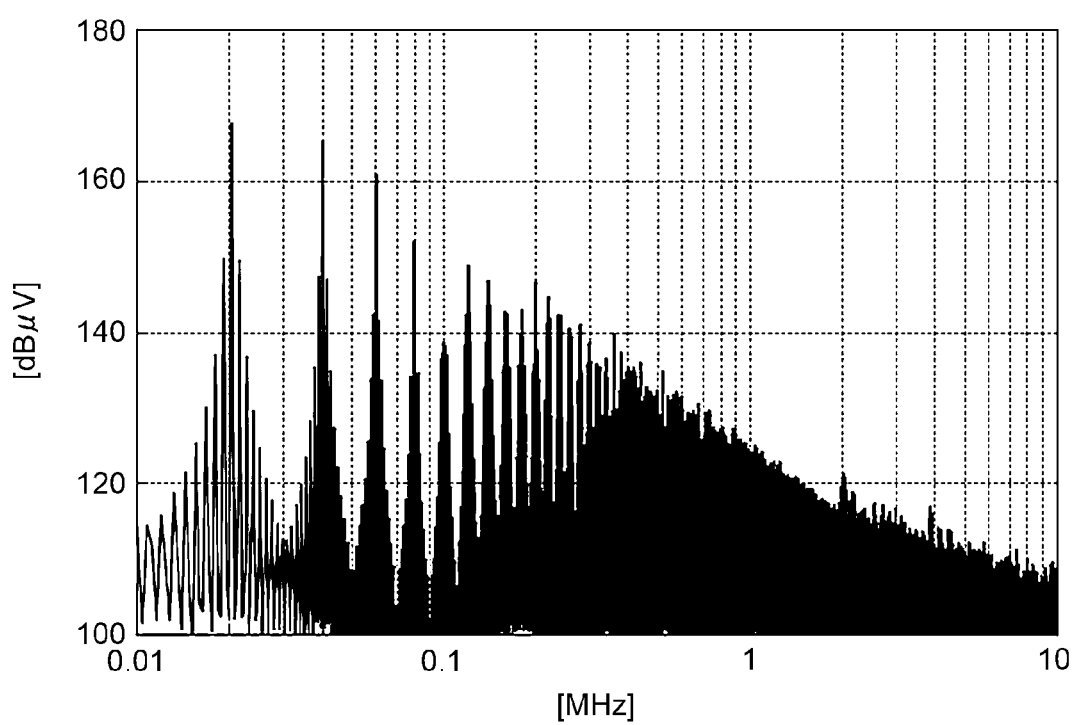
FIG. 16 is a diagram showing a frequency spectrum of the neutral point potential in the inverter device of FIG. 14.

Consequently, it is possible to reduce common mode noise generated in one carrier cycle to ⅓. FIG. 9 shows a frequency spectrum (FFT result) of the neutral point potential Vc in the inverter device 1 of the embodiment. As is also clear from this figure, according to the present invention, it can be seen that the fluctuation of the neutral point potential Ve is more effectively suppressed as compared with the methods shown in FIGS. 12 and 13 and the general discontinuous modulation method shown in FIG. 16.

As described in detail above, according to the present invention, the control device 21 has the phase voltage command operation unit 33 which calculates and outputs the continuous modulation voltage command value for generating the voltage applied to each phase of the motor 8, the inter-line modulation operation unit 34 which calculates based on the continuous modulation voltage command value, the discontinuous modulation voltage command value for fixing the ON/OFF state of the upper and lower switching elements of one phase of the inverter circuit 28 and modulating the ON/OFF state of the upper and lower arm switching elements of the other two phases, and the PWM signal generation unit 36 which generates the PWM signal which performs PWM control on the inverter circuit 28, based on the discontinuous modulation voltage command value. Therefore, it is possible to reduce the number of switchings of the upper and lower arm switching elements 18A to 18F by the discontinuous modulation, reduce the switching loss and the amount of heat generated, and also reduce the fluctuation of the neutral point potential of the motor 8.

In addition to that, in the present invention, the control device 21 synchronizes the switching timings of the upper and lower arm switching elements of the two phases in which the ON/OFF state is modulated, and cancels out the change in the phase voltage applied to the motor 8 by the change in another phase voltage. Therefore, it is possible to further suppress the fluctuation of the neutral point potential of the motor 8 by the switching timings of the switching elements 18A to 18F, and remarkably suppress the generation of the common mode noise.

Further, even if an error occurs in the synchronization of the switching timing, the noise suppression effect by reducing the fluctuation of the neutral point potential by the above discontinuous modulation can be obtained at the minimum. Therefore, as a whole, it is possible to stably realize the inverter device 1 with little noise.

In this case, the control device 21 of the embodiment starts the specified section of switching from the state in which the upper arm switching element of one of the two phases in which the ON/OFF state is modulated is turned ON and the lower arm switching element of the other thereof is turned ON. Therefore, it is possible to smoothly cancel the change in the phase voltage by the change in the other phase voltage.

In particular, the control device 21 of the embodiment synchronizes only either one of the timings of the fall of the phase voltage of one of the two phases in which the ON/OFF state is modulated and the rise of the phase voltage of the other thereof, and the timings of the rise of the phase voltage of one thereof and the fall of the phase voltage of the other thereof. Therefore, the inconvenience of narrowing the modulation width as in the case of synchronizing both timings can also be eliminated or suppressed. Thus, it becomes possible to drive the motor 8 at a high modulation rate.

In this case, since the control device 21 of the embodiment selects and synchronizes the timing with which the surge voltage at the time of switching is larger, the surge voltage generated in the electric circuit can also be effectively suppressed.

Further, the control device 21 of the embodiment always modulates the ON/OFF state in the upper and lower arm switching elements of the specific one phase (U phase in the embodiment), and fixes the ON/OFF state of the upper and lower arm switching elements of one of the remaining two phases. Therefore, it is possible to easily and smoothly realize both the discontinuous modulation and the synchronization of the switching timing.

In this case, in the embodiment, since the upper and lower arm switching elements 18A and 18D of the specific one phase (U phase) are arranged in the heat exchange relationship with the place where the temperature becomes the lowest in the electric compressor 16 (FIG. 3), the upper and lower arm switching elements 18A and 18D of the specific one phase are always switched without the ON/OFF state being fixed, and the upper and lower arm switching elements 18A and 18D of the specific one phase (U phase) in which the temperature rises are effectively cooled. It is thus possible to avoid inconvenience such as the forced stop of the electric compressor 16 in advance.

Further, in the embodiment, the PWM signal generation unit 36 corrects the discontinuous modulation voltage command value output by the inter-line modulation operation unit 34 to cancel the change in the phase voltage applied to the motor 8 by the change in the other phase voltage. Therefore, the inter-line modulation operation unit 34 no longer outputs such a discontinuous modulation voltage command value as to cancel the change in the phase voltage by the change in the other phase voltage, and the calculation is simplified.

Incidentally, in the embodiment, the upper and lower arm switching elements 18A and 18D of the U phase are always switched, but the upper and lower arm switching elements of another one phase (either V phase or W phase) may be adopted. Further, in the embodiment, the present invention is applied to the inverter device 1 which drives and controls the motor 8 of the electric compressor 16, but the inventions other than claim 6 are not limited thereto, and the present invention is effective for driving control of motors of various devices.

Further, in FIG. 4, according to the discontinuous modulation as described above, the lower arm switching element 18F of the W phase is fixed to the ON state in the phase of 0° to 120°, the upper arm switching element 18B of the V phase is fixed to the ON state in the phase of 120° to 180°, the upper arm switching element 18C of the W phase is fixed to the ON state in the phase of 180° to 240°, and the lower arm switching element 18E of the V phase is fixed to the ON state in the phase of 240° to 360°. However, the upper arm switching element 18B of the V phase may be fixed to the ON state in the phase of 60° to 120° in FIG. 4, and likewise, the upper arm switching element 18C of the W phase may be fixed to the ON state in the phase of 240° to 300°.

DESCRIPTION OF REFERENCE NUMERALS 1 inverter device
8 motor
16 electric compressor
18A-18F upper and lower arm switching element
19U U-phase half bridge circuit
19V V-phase half bridge circuit
19W W-phase half bridge circuit
21 control device
28 inverter circuit
33 phase voltage command operation unit
34 inter-line modulation operation unit
36 PWM signal generation unit
37 gate driver

The invention claimed is:

1. An inverter device comprising:
an inverter circuit having an upper arm switching element and a lower arm switching element connected in series for each phase between an upper arm power supply line and a lower arm power supply line, and applying a phase voltage at a connection point of the upper and lower arm switching elements of each phase to a motor as a three-phase AC output; and
a control device which controls switching of the upper and lower arm switching elements of each phase of the inverter circuit,
wherein the control device includes:
a phase voltage command operation unit which calculates and outputs a continuous modulation voltage command value for generating a voltage applied to each phase of the motor,
an inter-line modulation operation unit which calculates based on the continuous modulation voltage command value, a discontinuous modulation voltage command value which fixes an ON/OFF state of the upper and lower arm switching elements of one phase of the inverter circuit, and modulates an ON/OFF state of the upper and lower arm switching elements of the other two phases, and
a PWM signal generation unit which generates a PWM signal PWM-controlling the inverter circuit, based on the discontinuous modulation voltage command value, and
wherein the control device synchronizes switching timings of the upper and lower arm switching elements of the two phases in which the ON/OFF state is modulated, and cancels a change in the phase voltage applied to the motor by a change in the other phase voltage.

2. The inverter device according to claim 1, wherein the control device starts a specified section of switching from a state in which the upper arm switching element of one of the two phases in which the ON/OFF state is modulated is turned ON, and the lower arm switching element of the other is turned ON.

3. The inverter device according to claim 2, wherein the control device synchronizes only either one of timings of a fall in the phase voltage of one of the two phases in which the ON/OFF state is modulated and a rise in the phase voltage of the other, and timings of a rise in the phase voltage of the one and a fall in the phase voltage of the other.

4. The inverter device according to claim 1, wherein the control device synchronizes only either one of timings of a fall in the phase voltage of one of the two phases in which the ON/OFF state is modulated and a rise in the phase voltage of the other, and timings of a rise in the phase voltage of the one and a fall in the phase voltage of the other.

5. The inverter device according to claim 4, wherein the control device selects and synchronizes the timing with which a surge voltage at the time of switching is larger.

6. The inverter device according to claim 1, wherein the control device always modulates the ON/OFF state in the upper and lower arm switching elements of a specific one phase and fixes the ON/OFF state of the upper and lower arm switching elements of one of the remaining two phases.

7. The inverter device according to claim 6, wherein the upper and lower arm switching elements of the specific one phase are arranged in a heat exchange relationship with a place where the temperature becomes the lowest in an electric compressor.

8. The inverter device according to claim 1, wherein the inter-line modulation operation unit outputs the discontinuous modulation voltage command value which always modulates the ON/OFF state in the upper and lower arm switching elements of the specific one phase and fixes the ON/OFF state of the upper and lower arm switching elements of one of the remaining two phases, and wherein the PWM signal generation unit corrects the discontinuous modulation voltage command value output by the inter-line modulation operation unit to cancel the change in the phase voltage applied to the motor by the change in the other phase voltage.

\* \* \* \* \*